United States Patent
Sharifi Mehr

(10) Patent No.: US 10,904,277 B1
(45) Date of Patent: Jan. 26, 2021

(54) THREAT INTELLIGENCE SYSTEM MEASURING NETWORK THREAT LEVELS

(71) Applicant: Amazon Technologies, Inc., Seattle, WA (US)

(72) Inventor: Nima Sharifi Mehr, Vancouver (CA)

(73) Assignee: AMAZON TECHNOLOGIES, INC., Seattle, WA (US)

(*) Notice: Subject to any disclaimer, the term of this patent is extended or adjusted under 35 U.S.C. 154(b) by 315 days.

(21) Appl. No.: 15/907,088

(22) Filed: Feb. 27, 2018

(51) Int. Cl.
*H04L 29/06* (2006.01)
*G06F 9/455* (2018.01)
*H04L 12/26* (2006.01)

(52) U.S. Cl.
CPC .......... *H04L 63/1425* (2013.01); *G06F 9/455* (2013.01); *H04L 43/08* (2013.01)

(58) Field of Classification Search
CPC ................................................. H04L 63/1425
See application file for complete search history.

(56) References Cited

U.S. PATENT DOCUMENTS

| 8,918,785 B1* | 12/2014 | Brandwine | G06F 9/455 718/1 |
| 2013/0054215 A1* | 2/2013 | Stubna | G16H 50/50 703/11 |
| 2018/0167402 A1* | 6/2018 | Scheidler | H04L 63/1416 |

\* cited by examiner

*Primary Examiner* — Simon P Kanaan
(74) *Attorney, Agent, or Firm* — Quarles and Brady LLP

(57) ABSTRACT

Systems for providing a threat intelligence system differentiate between network activity that is a mass scan, or is an accidental or otherwise benign abnormality, or is a directed attack. All of the network activity of a computing resource service provider is logged, and the logs are parsed to include the activity of a particular activity source. The activity is stored in an activity profile, and is updated on a rolling window basis. The systems then use the activity profiles of activity sources that have communicated with a user's computing resources to determine whether the activity and/or activity source is a potential threat against the user's virtual computing environment(s) and/or the computing resources executing therein. The system computes a threat level score based on parameters identified in the activity profiles.

20 Claims, 12 Drawing Sheets

THREAT INTELLIGENCE SYSTEM MEASURING NETWORK THREAT LEVELS

BACKGROUND

Generally described, computing devices utilize a communication network, or a series of communication networks, to exchange data. Companies and organizations operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

To facilitate increased utilization of data center resources, virtualization technologies may allow a single physical computing device to host one or more instances of virtual machines that appear and operate as independent computing devices to users of a data center. The single physical computing device may create, maintain, delete, or otherwise manage virtual machines in a dynamic manner. In some scenarios, various computing devices may be associated with different combinations of operating systems or operating system configurations, virtualized hardware resources and software applications to enable a computing device to provide different desired functionalities, or to provide similar functionalities more efficiently. Further, virtual machines may themselves be partitioned into multiple isolated virtual systems, sometimes referred to as "containers." The virtual machine controls allocation of resources such as processing power and memory, and each container has its own process and network space in which the container may, for example, execute software programs.

In such a system, a service provider may provide virtual machine resources to many different users, and may operate disparate physical computing devices that communicate with each other and with external resources over any number of networks and sub-networks of varying types. Physical and virtual computer networks provide security controls, such access policies, security groups, and network access control lists, to protect the assets inside them (i.e. computing and storage units, load balancers . . . ) against unauthorized access. These security controls can operate at different network layers (i.e. L4: transport or L7: application) and based on their configuration, they reject or drop any disallowed network traffic. Rejected network traffic could be caused by 1) accidental or other benign attempt to access an unauthorized port of entry (i.e. an authorized application to use port 443 of a load balancer is misconfigured and tries connecting to port 80), 2) an adversary running a mass scan (i.e. internet wide scans using ZMap), or 3) a targeted attack focusing on a limited number of networks. Such systems may benefit from monitoring of network traffic for potentially malicious communications.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1A:
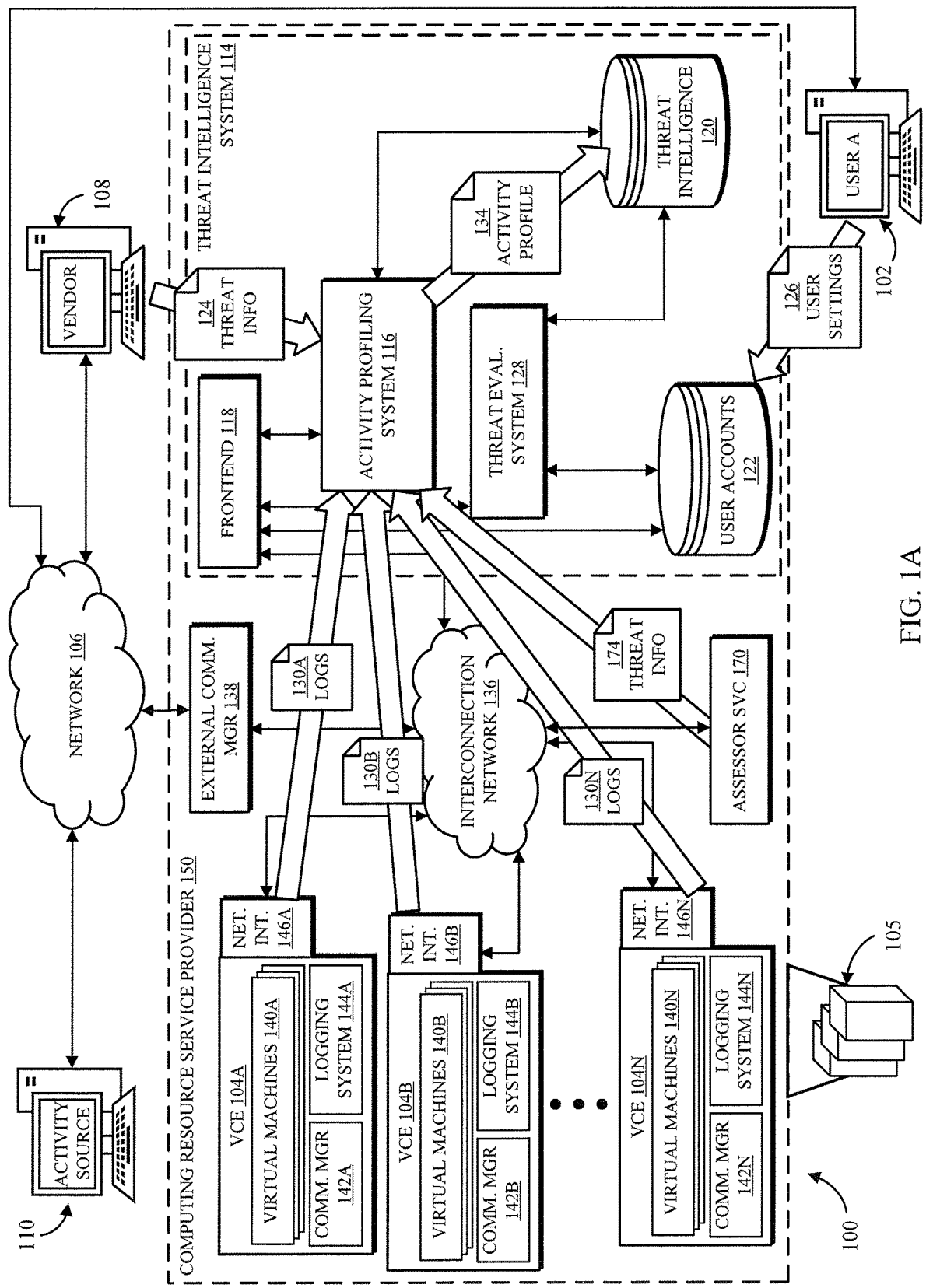
FIGS. 1A and 1B are diagrams of example systems for providing a threat intelligence system having activity profiling and threat level scoring, in accordance with some embodiments of the disclosed subject matter.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Techniques described and suggested herein relate to improvements in network activity monitoring and threat level quantification in multi-tenant computing environments. A computing resource service provider, such as a company or other organization, may operate computing resources programmatically managed by a customer of the computing resource service provider. For example, the computing resource service provider may operate a virtual computer system service, a marketplace that makes virtual machine appliances available for use by customers, and an on-demand storage service; these services may provide computing resources to customers of the computing resource service provider.

The customer may remotely load software, configure, start, stop, and perform other operations on computing resources made accessible to the customer by the computing resource service provider. At least a portion of the computing resources provided to the customer may be virtualized. For example, the computing resource service provider may provide computing resources such as virtual computer system instances to the customer. The customer can then use those virtual computer system instances to implement various applications and services, such as web servers, data storage systems, and network security functions. Similarly, vendors may package software into machine images that can be used to launch virtual machines. A customer can subscribe or otherwise obtain access to use such machine images to launch virtual machines into a virtual computing environment associated with the customer's account. A virtual computing environment (VCE) includes virtual networks, sub-networks, virtual network interfaces, and other physical and/or virtualize computing resources. Furthermore, VCEs can have access controls and other security measures associated therewith.

Developers and/or other users can use VCEs, such as a virtual network, to perform computing operations (e.g., execute tasks for providing applications, services, database access, etc.); they may wish to monitor network activity to and from the VCE to identify potentially malicious activity, or sources and/or destinations (together "activity sources" herein) of abnormal network traffic. In some embodiments, threat monitoring software and/or a threat monitoring service (e.g., a threat intelligence service) using threat intelligence to identify potentially malicious activity can be provided and/or operated by a computing resource service provider that implements the VCE; additionally or alternatively, a software or platform-as-a-service vendor or another third party can provide such software/services to users of the computing resource service provider's computing environment(s). Such a threat intelligence service may receive and/or access one or more threat intelligence feeds that contain information about potentially malicious computers on the Internet, such as hosts that serve exploitation tools or malware, botnet command and control hosts, and suspected compromised hosts. Threat intelligence feeds typically contain machine readable tuples of domain names, IPs, indicator types, descriptions, information sources, and other attributes of the identified threat. The threat monitoring software and/or threat intelligence service can be configured by a particular user to compare a set of network events in the user's computing resources to the available threat intelligence to find potential security issues. The effectiveness of the threat monitoring software and/or threat intelligence service is governed by the completeness, currency, and accuracy of the available threat intelligence.

Often, however, a user's VCE and/or the computing resources executing therein can be subjected to nascent, emerging, or directed attacks from activity sources that are unknown to threat intelligence providers. Real-time monitoring for identified threats can therefore be augmented by more abstract network activity analysis, such as by comparing activity logs to normal operating parameters to detect abnormal activity. Again, the effectiveness of this protection is limited by currency, accuracy, and completeness considerations. A particularly limiting factor is that a user can only monitor network activity of its own computing resources, and does not have visibility into the behavior of activity sources with respect to computing resources of other users. Simply detecting abnormal activity of a single network is not sufficient to differentiate a directed attack on a particular user's computing resources from other, benign activity of unauthorized activity sources. For example, IP port scanning software can scan the entire IPv4 address space in a matter of minutes; a user can expect public IP addresses of its VCEs to receive (and probably disallow) communications from unauthorized port-scanning activity sources almost constantly. However, this is not a directed attack and typically does not require a response or remediation. Simple network activity analysis also does not differentiate a directed attack from abnormal benign activity, such as an accidentally misconfigured application attempting to access the wrong port. Having high accuracy threat intelligence in this regard, particularly through visibility into network activity of other networks, would allow VCE owners to escalate their threat level and take actions (e.g., increased manual review of alarms, increased scrutiny on releasing new software into target networks, lowering alarming thresholds in security monitoring systems) which are expensive to carried on constantly.

The present disclosure describes a threat intelligence system that can be implemented in, or for use with, a computing resource architecture (i.e., "computing environment") of a computing resource service provider to monitor network activity associated with the VCEs and/or computing resources of all of the users of the computing resource service provider. As described below, the threat intelligence system can receive log information describing network activity between each VCE (or, for example, each virtual machine instance in a VCE) and each activity source (e.g., IP address, ISP, or other network identifier) that communicates with the VCE during a logging period. In some embodiments, the threat intelligence system can also receive threat information from one or more sources of threat intelligence information such as a threat intelligence vendor or another threat assessment service of the computing resource service provider.

The threat intelligence system can use the log information and any other threat information to create and maintain a database of activity profiles that each describe the network activity of a particular activity source. The network activity in an activity profile can be aggregated across all of the VCEs and/or computing resources associated with each of the user accounts of the computing resource service provider. Thus, the activity profile provides monitoring data of all of the networks in the computing environment. The activity profile can, in some embodiments, include data captures for each of the logging periods; the data captures can identify properties of the recorded network activity, such computing resources that allowed traffic from the corresponding activity source, computing resources that disallowed traffic from the activity source, and properties of the disallowed traffic such as ports accessed, protocols used, and volume of traffic.

The system may further aggregate the network activity over a rolling time window (e.g., 24 hours) that incorporates data of multiple consecutive logging periods (e.g., 24 one-hour periods). The activity profiles may therefore include data captures for each of the logging periods in the time window, and may further track aggregated parameters such as number disallowed requests, total volume of disallowed traffic, number of VCEs/computing resources that disallowed traffic, and the like. In some embodiments, the activity profile database can identify all of the activity sources having network activity with at least one VCE. Alternatively, the threat intelligence system may create an activity profile only for an activity source identified as a potential threat actor participating in a directed attack against one or more VCEs or computing resources. The system may therefore perform a threshold activity analysis against each activity source identified in the log information, using parameters that differentiate potential threat actors from clearly authorized activity sources (i.e., having no disallowed network activity) and from likely accidental or otherwise benign abnormalities (e.g., disallowed traffic with only one virtual machine instance or VCE, indicating a faulty configuration). For example, threshold parameters may include a minimum number of disallowed request messages, spread across computing resources of at least two user accounts.

The threat intelligence system can use the activity profiles to determine whether any of the activity sources had been, or appear to be, conducting a directed attack against a user's computing resources. In some embodiments, the system can obtain information for identifying the user's computing resources, such as a public IP address, a resource name, or another identifier, and can use the identifying information to determine whether any of the computing resources appear in any of the data captures in an activity profile, indicating that the identified computing resource had some amount of network activity with the corresponding activity source.

The system can then evaluate the data of the activity profile in view of one or more parameters that indicate whether an activity source is a threat actor against the user account, the user's VCE, and/or particular computing resources associated with the user. In one example, the system may determine (e.g., using the activity profile) how many user accounts that are independent from the target user account (e.g., have different organizations and/or different billing information) have a "disallow" relationship with the activity source—that is, network activity from the activity source to the VCE/computing resources of the corresponding user has been disallowed in the past. If this number is zero or very low (e.g., three or four other user accounts), the activity source's communications may be characterized as a potential directed attack and the activity source as a threat actor; in contrast, a large number of user accounts with a "disallow" relationship suggests non-directed activity such as a port scan, and the activity source would not be identified as a threat actor (absent other threat information, such as from a third party or another service of the computing resource service provider).

The system keeps a count of threat actors by performing the above identification procedure against some or all of the activity profiles. Additionally, the system may aggregate data from the activity profile of each threat actor in order to calculate threat level metrics. In some embodiments, the system uses a multi-factor threat level assessment; the factors may include any measureable property of network activity, occurring in any level of the network protocol stack, which could have a value that indicates malicious activity. For example, the factors may include, without limitation, any or all of: the number of threat actors involved in the directed attack; the total volume of traffic, or of disallowed traffic, from the threat actors; the number of ports the threat actors try to access; the number of communication protocols the threat actors use to send messages; and, the number of computing resources (e.g., virtual machine instances) the threat actors try to communicate with. The data needed to assess the factors may be collected from the threat actor activity profiles and then combined in order to produce metric values corresponding to the threat level factors.

Finally, the system may calculate a threat level score for the user account, based on the activity of threat actors against it. A multi-factor calculation may include a weight scalar for each factor according to the factor's importance to a severity of the threat. Each factor may also have a completeness value used to assess the "completeness" of the threat with respect to that factor. The completeness value represents the highest threat level for that factor, and the comparison of the metric value to the completeness value, expressed as a percentage, is the completeness of the threat. For example, if the completeness value for number of ports accessed is five distinct ports, and the network activity indicates the threat actors access three ports, the completeness for the factor is 60%; for five or more ports, the completeness is 100%. Each factor's completeness is multiplied by its weight, and the results are summed for all factors to obtain the threat level score, between 0.0 and 1.0 or expressed as a percentage. The system may take any suitable action based on the threat level score, such as report the threat level score to the user via a user interface, combine the score with previous threat level scores or other threat intelligence, generate one or more alerts if the threat is sufficiently severe, or perform automated remediation tasks.

FIG. 1A depicts an example of a system 100 for providing a threat intelligence system 114 that, in accordance with some embodiments of the disclosed subject matter, evaluates network activity of all computing resources executing in a computing environment 150 of a computing resource service provider and associated with each of the users of the computing resource service provider. That is, in some embodiments, every computing resource of the computing environment 150 that is associated with a user and sends or receives some recordable network activity may have that network activity evaluated by the threat intelligence system 114. As shown in FIG. 1A, in some embodiments, system 100 can include a computing device 102 associated with a user (e.g., "user A") of a compute service. In some such embodiments, the user can be a person (e.g., a developer, a website administrator, an application administrator, etc.) or an entity (e.g., a corporation, a non-profit organization, etc.). Additionally, in some embodiments, computing device 102 can act programmatically to perform one or more actions. Although shown as a single computing device, computing device 102 can be any suitable computing device or combination of devices. Additionally, in some embodiments, actions described herein as being performed by computing device 102 can be performed by one or more virtual machines that are part of a compute service. That is, computing device 102 can be one or more virtual machines that are part of a compute service.

In some embodiments, computing device 102 and other computing devices (e.g., computing device 108 of a vendor and/or computing device 110 of an activity source) can access computing resources and services of the computing environment 150 over an external (i.e., outside of the computing environment 150) communication network 106. In some embodiments, communication network 106 can be any suitable wired network, wireless network, any other suitable network, or any suitable combination thereof. Additionally, communication network 106 can be any suitable personal area network, local area network, wide area network, over-the-air broadcast network (e.g., for radio or television), cable network, satellite network, cellular telephone network, any other suitable type of network, or any suitable combination thereof. For example, communication network 106 can be a publicly accessible network of linked networks, in some cases operated by various distinct parties, such as the Internet. In some embodiments, communication network 106 can be a private or semi-private network, such as a corporate or university intranet. Additionally, in some embodiments, communication network 106 can include one or more wireless networks, such as a Global System for Mobile Communications ("GSM") network, a Code Division Multiple Access ("CDMA") network, a Long Term Evolution ("LTE") network, any other suitable wireless network, or any suitable combination of wireless networks. Communication network 106 can use any suitable protocols and/or components for communicating via the Internet and/ or any of the other aforementioned types of networks. For example, communication network 106 can use one or more protocols or combinations of protocols, such as Hypertext Transfer Protocol ("HTTP"), HTTPS, Message Queue Telemetry Transport ("MQTT"), Constrained Application Protocol ("CoAP"), etc.

As described above, the present systems and methods for measuring network threat levels can be used in computer systems 105 upon which the computing resource service provider implements the virtualized computing environment 150 allowing customers to implement VCEs 104A,B, . . . N comprising virtual computing resources, such as virtual machine instances 140A,B, . . . N, container instances, logical data storage devices, virtual network interfaces 146A,B, . . . N, load balancers, and the like, all interconnected with virtual private networks. Further, VCEs 104A-N, and computing resources therein, may communicate with each other and with various services and systems of the computing environment 150 (e.g., threat intelligence system 114, security assessor service 170, external communication manager 138) via one or more interconnection networks 136, which may be physical and/or virtual networks.

The physical (i.e., hardware) computing systems 105 may be co-located in one or more data centers or may be remote from each other, and may be interconnected via various networking devices and one or more physical networks. The physical computing systems 105 and other devices are used in this example by a network service to enable customers to arrange their virtual computing resources into multiple computer networks. The customers' networks can be implemented as VNs that use the physical network(s) as a substrate network upon which the VNs are overlaid. Accordingly, computing environment 150 can provide virtual computer networks to customers by implementing the virtual networks as overlay networks using an underlying physical substrate network, such as using various communication managers 142A,B, . . . N and one or more external communication managers 138. In at least some embodiments, one or more system manager modules (not shown) may further facilitate configuring communications between virtual computing resource instances, such as by tracking and/or managing which virtual computer system instances belong to which provided virtual networks, and by providing information about actual physical substrate network addresses that correspond to virtual network addresses used for a particular virtual network (e.g., by a particular customer or other entity). In addition, such a system manager module may receive an indication of a virtual computing resource instance on a target physical computing system 105 and of a provided virtual network to which the virtual computing resource instance is to be associated, and then initiate configuration of a virtual machine communication manager for the target physical computing system 105 so as to associate the virtual computer system instance with the virtual network, or the node communication manager module may instead initiate that configuration (e.g., when the virtual computer system instance first initiates or receives a communication).

A VCE 104A may host multiple virtual machine instances 140A as well as a communication manager 142A configured to route data communications to and from the virtual machine instances 140A. In an embodiment, each of the virtual machine instances 140A may operate as a distinct computing node of a computer network provided for a customer. Virtual machine instances 140A may resemble conventional computing resources, such as web servers, application servers, content servers, remote workstations, etc., that have been instantiated by the customers of environment 150. Each virtual machine instance 140A may be assigned a virtual network interface 146A enabling each virtual machine instance 140A to communicate with components internal or external to environment 150. Thus, in some embodiments, each virtual machine instance 140A within a VCE 104A may be assigned a public IP address that activity sources 110 on the external computing network 106 can use to send communications directly or indirectly to the virtual machine instance 140A. Additionally or alternatively, a virtual network interface 146A may implement a subnet or other address space for the VCE 104A which has certain security restrictions.

Each VCE 104A-N may further include a logging system 144A,B, . . . N configured to monitor network traffic passing through the VCE 104A-N and generate log data based thereon. With respect to network activity to and from a virtual machine instance 140A-N, a hypervisor managing the VCE 104A-N running the virtual machine instance 140-N may store, for example, an identifier of a machine image used to launch the virtual machine instance 140A-N. Additionally, the hypervisor can be programmed to make the image identifier available to the relevant logging system 144A-N as well as information that identifies which communications are associated with the virtual machine (e.g., an identifier of a virtual network interface, a virtual IP address used by the virtual machine). As such, when the logging system 144A-N processes data packets the logging system 144A-N can match information in the packets to the information that identifies which communications are associated with the virtual machine instance 140A and add the machine image identifier to the record.

Computing environment 150 includes an interconnection network 136 to route communications within computing environment 150, such as by forwarding packets or other data transmissions as appropriate based on characteristics of such data transmissions (e.g., header information including source and/or destination substrate network addresses, protocol identifiers, etc.) and/or the characteristics of the interconnection network 136 itself (e.g., routes based on physical network topology, etc.). In some embodiments, the interconnection network 136 delivers data transmissions leaving the computing environment 150 to an external communication manager 138 that manages external communications that enter and leave environment 150. In some embodiments, the external communication manager 138 may translate network activity between the address spaces of the computing environment's 150 virtual networks and the address space of the external communication network 106. Alternatively, the external communication manager 138 may be a simply router configured to pass data transmissions from source to destination.

In such a VN setup, a program executing for the customer USER A on a virtual machine instance 140A that is part of the customer's VCE 104A may then direct an outgoing communication (not shown) to a virtual machine instance 140B that is part of an independent VCE 104B, such as by specifying a virtual network address for that provided virtual computer network that is assigned to that destination virtual machine instance 140B. When sending such a communication, communication manager 142A receives the outgoing communication from the virtual machine instance 140A, and in at least some embodiments determines whether to authorize the sending of the outgoing communication. If communication manager 142A determines that the outgoing communication is authorized (or does not perform such an authorization determination), communication manager 142A determines the actual physical substrate network location corresponding to the destination virtual network address for the communication. Communication manager 142A then encapsulates the communication in a data packet that is addressed to communication manager 142B using a physical network address for a physical computer system 105 underlying the VCE 104B.

When communication manager 142B receives the communication via interconnection network 136, communication manager 142B extracts the virtual destination network address and determines to which of the virtual machine instances 140B the communication is directed. This may involve communication manager 142B determining whether the communication is authorized for the destination virtual machine instance 140B. If the communication is determined to be authorized (or communication manager 142B does not perform such an authorization determination), communication manager 142B removes the encapsulating data packet of the communication, effectively re-headering the incoming communication so that it is directed to the virtual network address of the destination virtual machine instance 140B. After re-headering the incoming communication, communication manager 142B then forwards the modified communication to the destination virtual machine instance 140B for processing.

If the sending virtual machine instance 140A instead (or in addition) directs an outgoing communication (not shown) to one or more intended destination computing systems external to environment 150, communication manager 142A receives and handles the outgoing communication in a similar manner, but packaging the communication for delivery to the external communication manager 138 and/or to the ultimate destination. During operation, communication managers 142A-N may process data packets that are incoming and outgoing from their respective VCEs 104A-N. This may involve the communication managers 142A-N publishing processed (or partly-processed) data packets or communication flows into a queue, ready for transmission via the physical network infrastructure of environment 150. While the data packets or communication flows (or summaries of the same) reside within such a queue, the information describing the network communications being processed by the communication managers 142A-N can be accessed by the respective logging system 144A-N for processing, as described below, to generate network log information.

While the various communication managers of environment 150 operate to route data packets between the various virtual machine instances 140A-N and external networked devices such as activity sources 110, the logging systems 144A-N identify attributes of those data packets and record those attributes into a corresponding log file 130A,B, . . . , N. The log file 130A-N may be local to (i.e., stored in a data store of) the VCE 104A-N or remote (e.g., stored within another data storage system as described further below). The log information in log files 130A-N can include customer identification information, virtual network driver identification information, packet count, byte count, timestamp corresponding to the start of the corresponding communication flow, timestamp corresponding to the end of the corresponding communication flow, source of data transmission, destination of data transmission, communication ports and protocols to use, and any security actions taken by the corresponding communication manager 142A-N. In some embodiments, logging systems 144A-N are also configured to identify a VN associated with the network traffic being logged (e.g., by accessing a look-up table of VNs made available through one or more of communication managers 142A-N) and incorporate the identification of the VN generating the network traffic into the log data.

Generally herein, network activity that is evaluated by the threat intelligence system 114 is formatted, encapsulated, segmented (i.e., into data packets), and otherwise prepared and transmitted from a source to a destination over one or more communication networks (which may include the external communication network 106) using the TCP/IP protocol stack. In particular, the activity that is recorded (i.e., in log files 130A-N) occurs in the IP, application, and transport layers of the protocol stack. However, it will be understood that the threat intelligence system 114 can be implemented to analyze network activity arranged according to the Open Systems Interconnection (OSI) model or any other networking model in which network activity can be detected and recorded.

Generally, logging systems 144A-N will monitor traffic flowing through their respective communication manager 142A-N. Upon identifying a data packet (or communication flow) passing through the respective communication manager 142A-N, the logging system 144A-N will generate a log entry containing basic information about that data packet or communication flow. To illustrate, Table, depicts a raw log entry that may be generated by a logging system 144A-N.

TABLE 1

2 123456789010 eni-abc123de 172.31.16.139 172.31.16.21 20641 22 6 20 4249 1418530010 1418530070 ACCEPT OK In the raw log entry of Table, the log entry includes a user identification or VN identification for the logging data ("123456789010"), an identification of the virtual interface processing the data packet that generated the log entry ("eni-abc123de"), source IP address ("172.31.16.139"), destination IP address ("172.31.16.21") source port ("22"), destination port ("6"), protocol identification ('6"), a size of the data packet or communication flow (4249), start and end times for the flow ("1418530010" and "1418530070", respectively), and an indication of whether the traffic was accepted ("ACCEPT") and whether the logging activity successfully completed ("OK"). In various embodiments, log files 130A-N can include one or more log entries, one or more items of information extracted from one or more log entries (and, in some cases, not the log entries themselves), one or more items corresponding to information (e.g., IP addresses) that appears at least once in a group of one or more log entries, etc. Additionally, in some embodiments, log files 130A-N can include IP addresses, identifying information, etc., associated with a request to one or more services associated with the computing resource service provider (and/or one or more other service providers). For example, the information can include IP addresses from which API calls were made to a service using account information associated with a user of computing device 102 (e.g., user A). In some embodiments, log information related to activity by computing device 102 (e.g., communication to and/or from a virtual network) and, in some cases, other computing devices associated with the user of computing device 102, can be maintained separately from log information related to API calls from user accounts associated with computing device 102.

In some embodiments, the logging system 144A-N is configured to monitor the network activity for a specified logging period, during which all log entries are stored in the same log file 130A-N; the log file 130A-N may be stored or transmitted for processing with the logging period expires, and the logging system 144A-N may start a new log file 144A-N. Consecutively generated (using a fixed logging period) log files 130A that are immediately sent to a data processing system when each corresponding logging period ends are referred to collectively as a "log stream." Log files 130A-N generated (by one or more logging systems 144A-N) during a specified time window and stored together to await processing are referred to collectively as a "batch" of logs.

Thus, as one illustrative example, one VCE 104A and its virtual machine instances 140A and other virtual computing resources may be associated with a user account of a particular customer (i.e., USER A), while another VCE 104B and its computing resources may be associated with a different user account of another customer. Additionally, a user account may be associated with more than one VCE and/or with computing resources on multiple VCEs. In some embodiments, user accounts of the computing resource service provider may be arranged in a hierarchy; some user accounts may belong to a group account, or may be a sub-account of a master account, and the like. A VCE 104A may be associated with a group account comprised of multiple user accounts, or with a master account having one more sub-accounts. In some embodiments, two user accounts may be related by other user data, such as common billing or contact information, or association with the same organization. Herein, two user accounts are said to be "independent" of each other if there is no hierarchical, organizational, or common-owner relationship between them.

The log files 130A-N may be delivered to the threat intelligence system 114 as illustrated in FIG. 1A. In some embodiments, logging systems 144A-N can provide log files 130A-N to threat intelligence system 114 at any suitable time, such as at regular intervals (e.g., every five minutes, every ten minutes, etc.), at irregular intervals, or in response to triggering events (e.g., when a threshold amount of log information has been generated). Note that, although logging systems 144A-N are described herein as providing log files 130A-N, this is merely an example and log information can be provided by any suitable computing device or combination of computing devices For example, in some embodiments, log files 130A-N can be provided by a virtual machine, a user device, a message relay service, etc.

In some embodiments, the threat intelligence system 114 includes an activity profiling system 116 that can receive the log files 130A-N through a frontend 118. In some embodiments, frontend 118 can receive and process messages from computing device 102, VCEs 104A-N, computing device 108, and/or any other computing device. For example, in some embodiments, frontend 118 can serves as a "front door" to other services provided by threat intelligence system 114. Frontend 118 can process the messages received from various computing devices and/or generated, for example, in response to events (e.g., when a threat level score is requested), and can determine whether the messages are properly authorized. In some embodiments, frontend 118 can include one or more web servers configured to expose one or more application program interfaces ("APIs") that can receive messages from one or more computing devices 102, computing device 108, etc., as API calls. In some embodiments, frontend 118 can extract requests from the API call and write them to a data store associated with the threat intelligence system. In one example, USER A, using computing device 102, may call the API to access a control interface that includes user input prompts for activating the threat level scoring on the user's account and/or for entering user settings 126 that configure the threat intelligence system 114.

The activity profiling system 116 creates activity profiles 134 and stores the activity profiles in a threat intelligence data store 120. An activity profile 134 may comprise an identifier of the activity source 110 associated with the activity profile 134, and further may comprise secondary identifiers such as an internet service provider (ISP), an organization, and/or a geolocation associated with the activity source's IP address. The activity profile 134 further includes data describing the network activity logged by any of the logging systems 144A-N and identifying the corresponding activity source 110 as a source or a destination of data transmissions.

The activity profiling system 116 transforms the log files 130A-N into the data stored in one or more activity profiles 134, generally, by identifying the entries in the log files that reference an identifier (e.g., an IP address, a network interface ID, a resource name) of the activity source 110; the activity profiling system 116 extracts these entries and then collects values from the entries for parameters that are used to monitor threat metrics. Non-limiting examples of such parameters include source and destination addresses, identifiers for a VCE 104A-N and/or one or more of its computing resources that sent, received, or processed the transmission, whether the transmission was accepted (allowed) or rejected (disallowed), data size, times sent and received, ports accessed, and protocols used. In some embodiments, the activity profiling system 116 may store all of the extracted information from an entry into its own entry in a data capture, which may be a set of records or other data structure storing the activity source's network activity for the logging period in which the network activity data was captured. Additionally or alternatively, the activity profiling system 116 may store in the data capture aggregate values across the entire logging period for certain parameters, non-limiting examples of which include total volume of traffic from the activity source, total number of disallowed transmissions, number of VCEs accessed, number of VCEs disallowing access, and the like.

The activity profiles 134 may be used to track network activity during a rolling window of a fixed length, which includes multiple logging periods. For example, the rolling window may be 24 hours, and the logging period may be one hour. An activity profile 134 may store a data capture as described above for each of the logging periods in the rolling window. Additionally, the activity profiling system 116 may aggregate the same or other parameters as are aggregated in a single data capture, but across the entire rolling window, and store the aggregate values in the activity profile 134. Thus, an activity profile 134 is, in some embodiments, a complete log of network activity between the corresponding activity source 110 and all user-specific resources executing in the computing environment 150 during the rolling window.

In some embodiments, a computing device 108 associated with a provider of a feed of threat intelligence information (e.g., "vendor") can interact with the threat intelligence system 114 to make threat information 124 developed by the vendor available to the threat intelligence system 114 as described further below. Similarly, the computing resource service provider may implement an internal security assessor service 170 that operates within the computing environment 150 to evaluate security issues using data that may not be acceptable but to internal services; the security assessor service 170 may also develop threat information 174 and provide it to the threat intelligence system 114. In some embodiments, the threat information 124, 174 can include any suitable threat intelligence information. For example, some organizations compile threat information that identifies potentially malicious actors. In some embodiments, the threat information can include a variety of pieces of information, such as an IP address, domain name, other indicators (e.g., Uniform Resource Locator ("URL"), a file hash, a signature, etc.), descriptive information regarding the threat, identifying information of one or more sources of the information, etc.

In some embodiments, the activity profiling system 116 can parse threat information 124, 174 to identify different types of threat information, and/or can reorganize information into a standardized format that can be used by the threat intelligence system 114. In some embodiments, the activity profiling system 116 can parse threat information 124 to identify one or more IP addresses, domains, URLs, file hashes, etc., and, in some cases, metadata related to the identified information (e.g., descriptions, etc.). As another example, in some embodiments, the activity profiling system 116 can search threat information 124 for tuples (e.g., by searching for particular characters or combinations of characters, such as commas, semicolons, spaces, etc.; by searching for particular strings of text, etc.) corresponding to individual threats, and can extract particular information from each tuple (e.g., an IP address, a domain name, a URL, descriptions, indicator types, file hashes, etc.) such that the information can be used by a threat intelligence system (e.g., as described below) to build a data structure (e.g., an in-memory IP address tree) and/or provide descriptive information to a user about a potential threat when the threat intelligence system 114 identifies potentially malicious activity.

In some embodiments, threat intelligence coordination system 116 can create and/or modify one or more entries in threat intelligence database 120 corresponding to threat information 124. In some embodiments, such an entry or entries can include a status of threat information 124 indicating whether the information contained in threat information 124 has been integrated into the threat intelligence system. In some embodiments, the activity profiling system 116 can modify one or more relevant activity profiles 134 to include the threat information 124, or useful portions thereof, in the calculated metrics for activity sources identified in the threat information 124. Additionally or alternatively (not shown in FIG. 1A), the threat intelligence system 114 (e.g., a threat evaluation system 128 thereof) may use the threat information 124 as a triggering event to initiate a threat level scan of related activity profiles 134, as described further below.

Figure 1B:
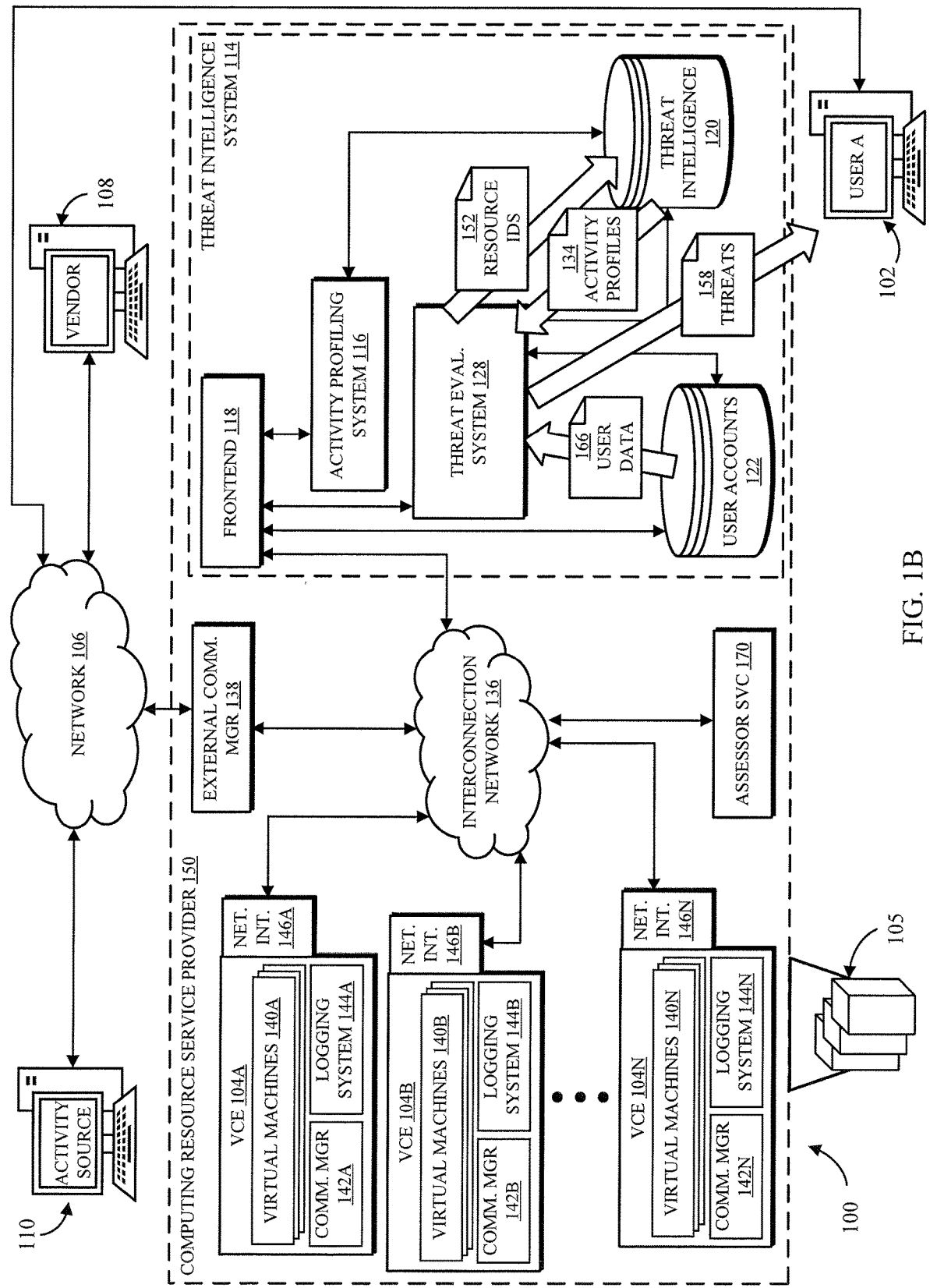

FIG. 1B illustrates subsequent processes in the system 100 of FIG. 1A. Specifically, at some point after the activity profiling system 116 has begun creating activity profiles 134, the threat evaluation system 128 may begin evaluating the threat level to computing resources of various users imposed by recent activity sources 110. In some embodiments, the threat evaluation system 128 may periodically conduct such a threat level scan, for the benefit of all users, or in some embodiments only for those users that have activated (and, ostensibly, paid for) the threat level scanning service. Additionally or alternatively, the threat evaluation system 128 may conduct a scan in response to a triggering event, such as a generation of new activity profiles 134, receipt of a scan request (e.g., from a user), receipt of threat information 124, modification of user data 166 of a user account database 122, deployment of new virtual machine instances 140A-N, and the like.

The threat evaluation system 128 performs the scan for a particular user account, receiving user data 166 including information for identifying the computing resources and/or VCE(s) of the user account within the activity profiles 134. The user data 166 may further include user settings 126 that modify parameters or set conditions of the scan. For example, the user may identify which computing resources to scan for, or may provide user-generated values for various thresholds, time periods, etc. The threat evaluation system 128 uses the resource identifiers 152 to query the threat intelligence database 120 and obtain the activity profiles 134 in which any of the resource identifiers 152 appear. The threat evaluation system 128 uses the aggregated parameters and/or the data captures of the activity profiles 134 to determine whether each corresponding activity source is a threat actor (i.e., as determined by aspects of the network activity, as described below). For each identified threat actor, the threat evaluation system 128 further uses the corresponding activity profile 134 to obtain the threat metrics and evaluate them against a threat level assessment, which may be a multi-factor measurement as described further herein. The threat evaluation system 128 may finally deliver the threat level score and other information about threats 158 to the computing device 102 of the corresponding user, and may additionally or alternatively take other responsive actions such as performing automated remediation, reporting the threat level score to other systems or devices, and the like.

Figure 2:
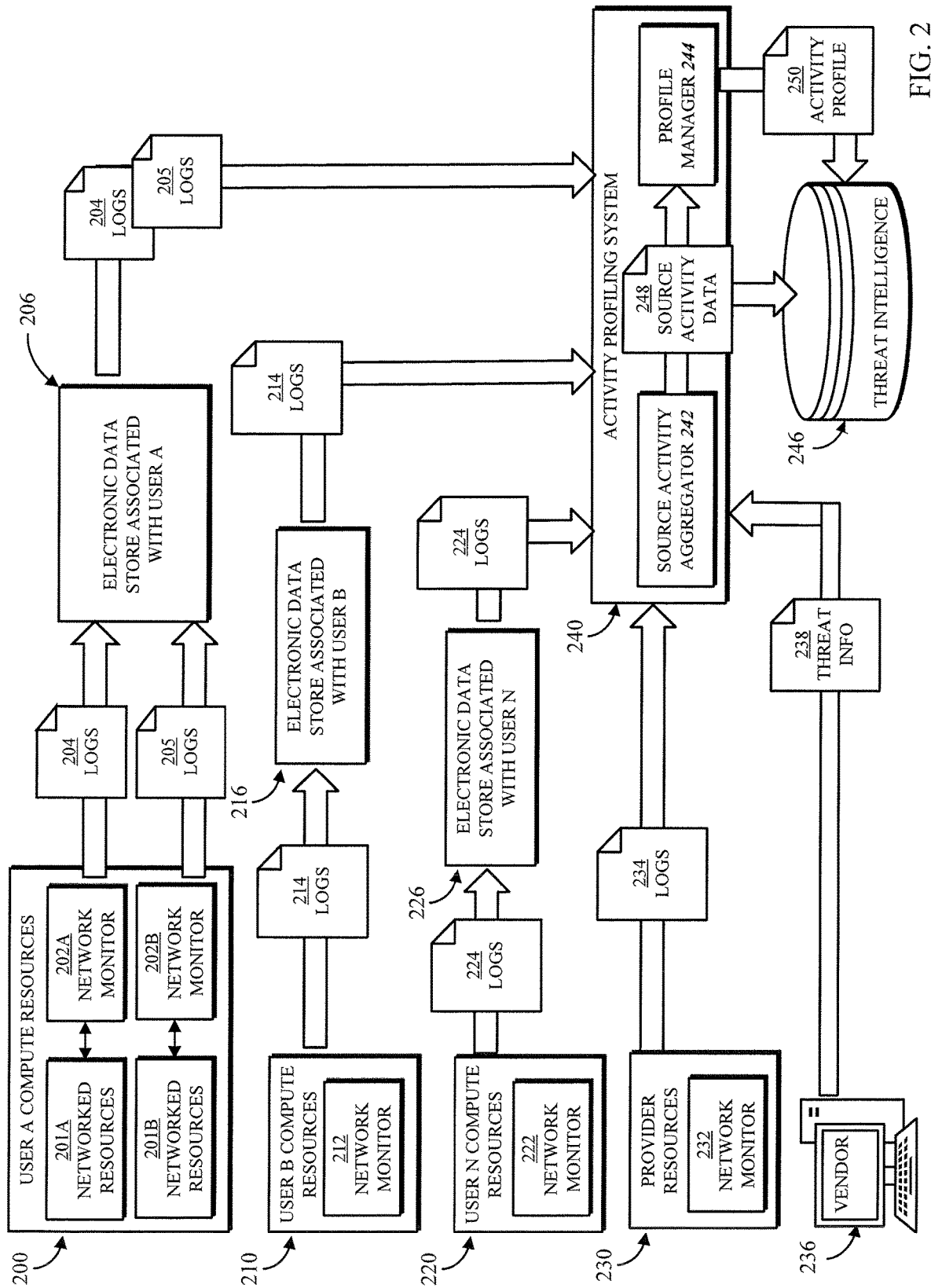
FIG. 2 is a diagram of an example system for processing multiple sources of network activity that can be used to generate activity profiles in accordance with some embodiments of the disclosed subject matter.

FIG. 2 shows an example data flow structure of multiple sources of network activity logs that can be used to generate activity profiles in accordance with some embodiments of the disclosed subject matter. In the example, User A computing resources 200, User B computing resources 210, and so on to User N computing resources 220, all executing in the computing resource service provider environment, generate network activity logs. User A computing resources 200 include networked resources 201A, 201B that may belong to different virtual networks or may be different VCEs. For example, the first networked resources 201A may be implemented in a first region of the computing environment, and the second networked resources 201B may be implemented in a second region of the computing environment which is communicatively isolated from the first region. Thus, each set of networked resources 201A, 201B may have a corresponding network monitor 202A, 202B, which may be a logging system of the corresponding VCE as described above, or may be a monitoring service of the computing resource service provider or an external monitoring service. The network monitors 202A, 202B produce log files 204, 205 describing the network activity of the resources 201A, 201B; similarly, network monitors 212, 222 of the corresponding computing resources 210, 220 produce network activity logs 214, 224.

In the illustrated embodiment, log files may be stored in an intermediate electronic data store associated with the corresponding user account for a suitable amount of time. Thus, log files 204, 205 of User A are stored in data store 206, log files 214 of User B are stored in data store 216, and so on through log files 224 of User N being stored in data store 226. Advantageously, the log files may be stored when the logging period used by the threat intelligence system does not correspond to a log generation frequency of all of the network monitors. For example, if a network monitor 212 generates log files 214 every five minutes, and an activity profiling system 240 processes log files 214 every hour, the data store 216 may store twelve log files as a batch that is processed together. The activity profiling system 240, as described above with respect to element 116 of FIGS. 1A-B, can actively retrieve log files from the data stores 206, 216, 226, or the data store or a data storage service may push the log files to the activity profiling system 240 in accordance with the logging period. Additionally, activity profiling system 240 may receive log files 234 from a network monitor 232 of one or more computing resources 230 of the computing resource service provider. For example, an external communication manager or another network interface may generate logs 234 that can provide additional details of the network activity to and from the computing environment. Finally, a computing device 236 of a vendor or another third party may submit threat information 238, as described above, to be processed by activity profiling system 240.

The activity profiling system 240 may include a source activity aggregator 242 that parses received log files and threat information and transforms the log information to produce source activity data 248. In some embodiments, the source activity data 248 may include a plurality of database, files, data structures, etc., each associated with one identified activity source from the log files. The source activity aggregator 242 may be configured to read all of the log files, in any format in which they are provided, to identify entries describing data communications sent or received by an activity source. The source activity aggregator 242 collects the same parameters of these data communications from entries in all of the log files and aggregates the values to produce the source activity data 248 for all activity sources appearing in the log files. The source activity data 248 may be stored in the threat intelligence database 246 and/or sent to the profile manager 244.

The activity profiling system 240 may include a profile manager 244 that receives the source activity data 248 and, for each activity source, determines whether to create a new activity profile 250, update an existing activity profile 250, or take no action. As described further below, in some embodiments only activity sources having at least some disallowed network activity may be associated with an activity profile 250, so as to reduce false positives as well as storage space for the activity profiles in the threat intelligence database 246. The profile manager 244 may determine whether the source activity data 248 describes at least a threshold amount of disallowed data before creating an activity profile 250. The profile manager 244 may also query the threat intelligence database 246 to determine whether an activity profile 250 for the activity source already exists, and if so, may retrieve the activity profile 250, update it with a new data capture and new aggregated parameter values, and store the updated activity profile 250.

Figure 3:
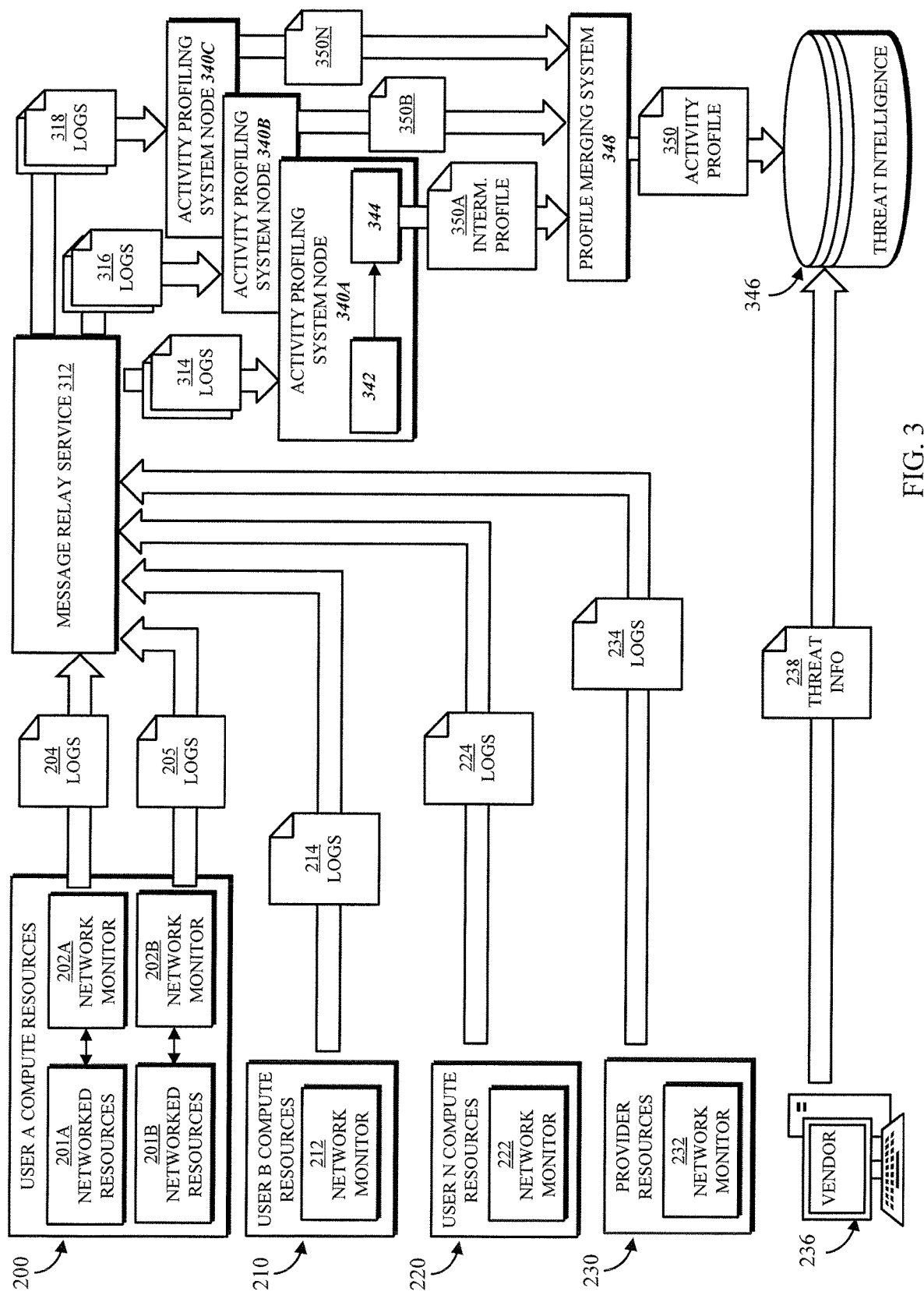
FIG. 3 is a diagram of another example system for processing multiple sources of network activity that can be used to generate activity profiles in accordance with some embodiments of the disclosed subject matter.

Referring to FIG. 3, an alternative implementation of the system presents the illustrated data flow. The user computing resources 200, 210, 220 and provider resources 230 may generate logs 204, 205, 214, 224, 234 as described above, while the vendor computing device 236 submits the threat information 238 for storage in a threat intelligence database 346 as previously described. The logs may be delivered to a message relay service 312, which can be accessed by a threat intelligence system for newly submitted log information as previously described. In such an example, the message relay service 312 can be configured as a first-in first-out storage from which the oldest log information is sent to threat intelligence system (e.g., in response to a request from threat intelligence system for log information via a frontend). The message relay service 312 may additionally or alternatively manage a plurality of queues configured to provide fair delivery of log files for processing. For example, User A computing resources 200 may produce a large volume of log information due to having many computing resources spread through several networks, while User B computing resources 210 produce a comparatively small volume of log information. The queues of message relay service 312 may be configured to allocate the log files 204, 205 of User A across a plurality of queues, while placing the log files 214 of User B into a single queue; then, by round robin or another selection method, one of User B's log files 214 will surely be retrieved for every three of User A's log files 204, 205, rather than being swamped by the log files 204, 205.

In some embodiments, the threat intelligence system may include a distributed activity profiling system comprising a plurality of nodes 340A-C disposed at diverse locations within the computing environment, and a centralized system such as a shard merging system 348, working together to generate and maintain activity profiles 350. In one embodiment, each node 340A-C includes a source activity aggregator 342 and a profile manager 344 as described above. The nodes 340A-C may pull log files 314, 316, 318 from the message relay service 312 according to any suitable selection process. In one embodiment, the nodes 340A-C may each produce intermediate activity profiles 350A-C composed of the source activity that the corresponding node 340A-C obtained from the logs it processed. These intermediate profiles 350A-C may be merged in the merging system 348 to produce a complete activity profile. 350. In another embodiment, each node 340A-C may maintain a copy of the database of activity profiles, and may produce respective shards of the database by generating activity profiles from the logs the node 340A-C processes, and storing the profiles in the local database.

In some embodiments, a load balancer (not shown) can distribute log information among different computing devices used by threat intelligence system to parse and/or check the log information for potentially malicious activity. For example, the load balancer can distribute log information to be analyzed among a group of computing devices (e.g., physical servers, virtual machine instances, containers, etc.) that have a replica of at least a portion of an activity profile database (and/or other suitable data structure). In some embodiments, the load balancer can determine the availability and/or workload of at least a portion of computing devices executing a portion of threat intelligence system (e.g., computing devices in the same region as the load balancer), and can route requests based on the workload of the various computing devices. Additionally, in some embodiments, the load balancer can stop routing log information to computing devices that are not responsive and/or are otherwise not processing log information that has previously been sent. In some embodiments, the load balancer can resend log information that was sent to a computing device that has become non-responsive. In some embodiments, the load balancer can send an alert (e.g., to an administrator of threat intelligence system) to indicate that a particular computing device is not processing log information.

Figure 4:
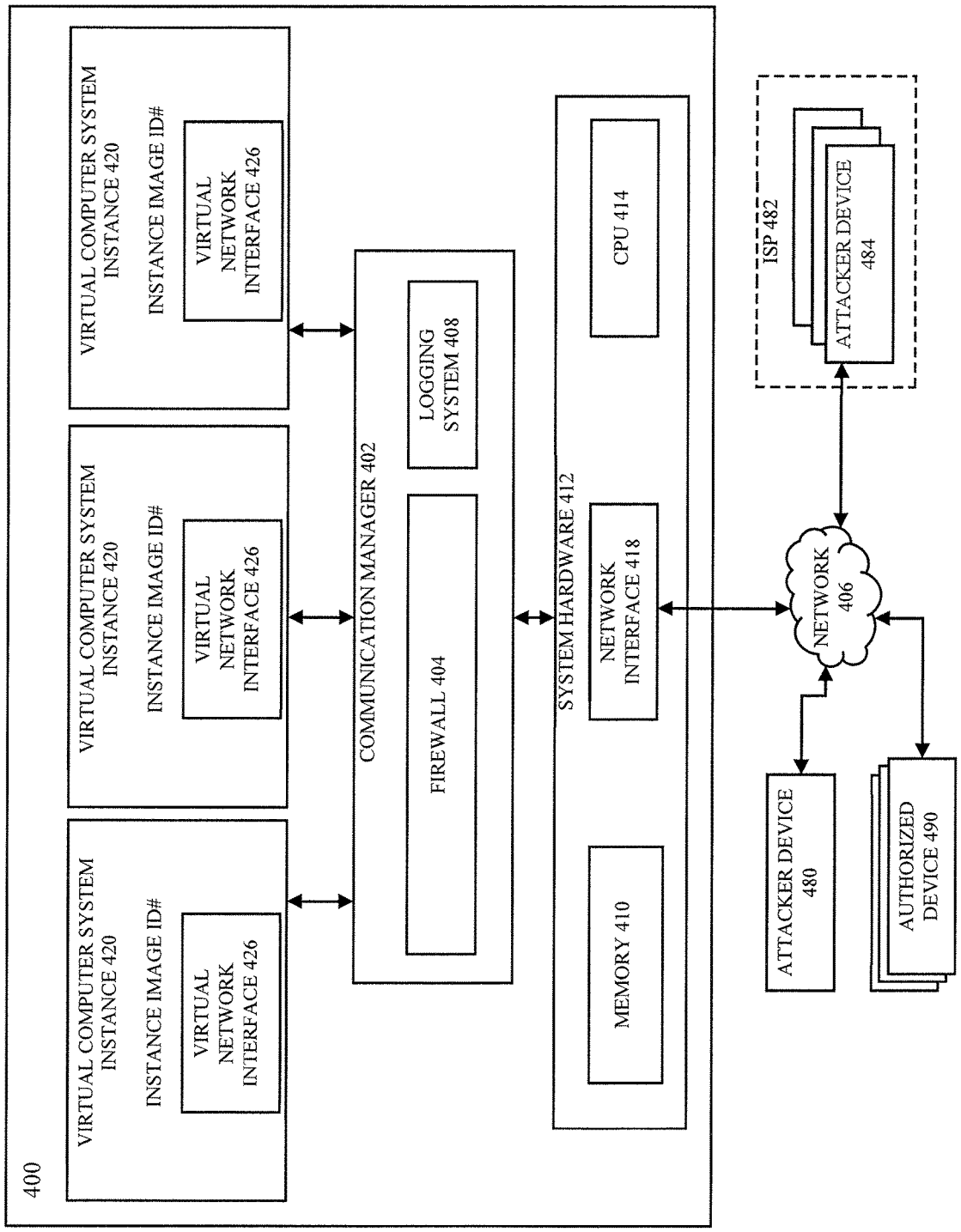
FIG. 4 is a block diagram of a server computer system that may be used to practice at least one embodiment of the present disclosure.

FIG. 4 depicts an illustrative, simplified block diagram of server computer system 400 that may be used to practice at least one embodiment of the present disclosure. Server computer system 400 includes system hardware 412 used to support the execution of a variety of computing resources. The system hardware 412 includes memory 410, one or more central processing units (CPUs) 414, and network interface 418. System hardware 412 may include other hardware devices not shown in FIG. 4 for simplicity, such as graphics devices, input output (I/O) controllers or any other hardware device suitable for supporting the execution of one or more communication managers 402 or other applications. Central processing units 414 (also referred to as processors for simplicity) may be communicatively coupled to a number of systems or hardware devices, such as memory 410, and network interface 418.

Server computer system 400 executes applications, including communication manager 402 and virtual computer system instances 420. Each virtual computer system instance 420 includes a virtual network interface 426 that can provide a network interface with a virtual IP address for virtual computer system instances 420 that is within the customer's VCE or other virtual network.

Virtual computer system instances 420 may be virtual computers configured to execute one or more applications as specified by the customer. For example, virtual computer system instance 420 may execute a web server operated by the customer, an application, a database, a firewall (e.g., configured to filter data transmissions through the virtual computer system instance 420), or a data storage system. Generally, virtual computer system instances 420 are created and configured by a customer of server computer system 400. In embodiments, at least some of the virtual machine images used to create the virtual computer system instances 420 are offered by an operator of server computer system 400 or a third party vendor.

The virtual machine images may be of many different types providing varying functionality. Generally, virtual machine instances launched from an image may be configured to perform any function on behalf of a customer of server computer system 400. In some cases, virtual machine instances may perform functions on network data packets or other communication traffic, such as an inspection of the contents of those data packets or routing of those data packets within a particular computer network. Virtual machine instances may provide security solutions or implement security appliances, including firewalls, intrusion detection systems, deep packet inspector systems, data loss prevention services, network appliances, and the like, data storage solutions, including cloud storage functionality, device backup solutions, database operations, and the like, and business intelligence solutions, including surveying solutions, resource scheduling solutions, and the like. In some example embodiments, each virtual machine instance may additionally or alternatively be launched and configured using a template that specifies how a virtual computer system instance 420 should be configured in order to provide the functionality provided by the product.

The machine image may include a set of configuration files that specify, for example, an image of an operating system including the product and resource set that should be allocated to the virtual computer system instance 420 executing the selecting product. The resource set may specify a number and configuration of processors, as well as a data storage capability for the virtual computer system instance 420. The data storage capabilities of the virtual computer system instance 420 may include specific requirements for volatile memory resources (e.g., random access memory (RAM) and cache) as well as persistent memory resources (e.g., local data storage requirements and remote networked data storage). The template can also specify a set of applications to be installed into the virtual computer system instance 420 to provide the functionality of the specified product, in an alternative embodiment.

Generally, configuration of a virtual computing system instance 420 can be performed by a user operating a suitable user interface for managing their virtual computing resources. The user interface may allow the user to search for and select a particular machine image and initiate instantiation of a correspondingly configured virtual computing resource. When instantiating a virtual computing resource, server computer system 400 can, using the image or template, automatically create and configure a virtual computer system instance 420 for use by the user. In some cases, the user may provide a number of additional inputs specifying particular details of how the virtual computer system instance 420 is to be configured once instantiated, such as by identifying a particular VCE or VN that the virtual computer system instance 420 should become part of.

After a virtual computer system instance 420 is instantiated into a VCE or VN, operation of the virtual computer system instance 420 may be partially or fully automated, and/or control thereof may be passed to the user. The determination of the physical host for the virtual computer system instance 420 may be based on a variety of factors, including a particular geographic area based at least in part on an IP address associated with the customer, load on one or more physical hosts, network traffic associated with the one or more physical hosts, request response latency of the one or more physical hosts or any other information suitable for selecting a physical hosts to instantiate one or more computer instances.

Communication manager 402 (which may, in some embodiments, be executed in a hypervisor or a DomO) includes a set of computer-executable instructions that, when executed by one or more processors of server computer system 400, causes server computer system 400 to provide a virtual operating platform and manage access to the system hardware 412 and virtual computer system instances 420. Communication manager 402 may be configured to route data packets between virtual computer system instances 420 and external computer systems through network 406 as well as between virtual computer system instances 420 themselves. In this disclosure a data packet may refer to a single encapsulated packet of data to be communicated using a suitable transport protocol, such as TCP/IP or UDP. In other cases, however, a data packet may refer to a communication flow that includes multiple data packets that are related to one another and part of a single data communication stream. In this disclosure, references to a data packet shall be understood to be equally applicable to a communication flow.

When receiving data packets from an external computer system (e.g., a computing device 480, 490 of an attacker or an authorized user) through network 406, communication manager 402 may analyze the received data packets to identify a destination virtual IP address of a particular target virtual computer system instance 420 to which the data packets are directed and to determine the IP address of the server hosting such virtual IP address. Having identified the target virtual computer system instance 420, communication manager 402 can be configured to encapsulate the data packets in data packets that are addressed to the server hosting the target virtual computer system instance. The packets are then routed to that target virtual computer system instance 420 for processing. Similarly, when a first target virtual computer system instance 420 transmits a data packet to a second target virtual computer system instance 420, communication manager 402 is configured to receive that data packet, identify the second target virtual computer system instance 420 and then transmit the data packet to the server hosting the second target virtual computer system instance 420 for processing.

In embodiments, communication manager 402 may use IP tunneling techniques to encapsulate and route communication data packets between the components of server computer system 400. The various components may be installed onto different hosts (i.e., physical computing systems) that are connected by a network. The network may include a physical network substrate that includes networking devices such as routers, switches, network address translators (NATs), and so on, as well as the physical connections among the various components and devices. Communication manager 402 then routes data packets through the network using IP tunneling. This enables communication manager 402 to receive data packets that, while being intended for delivery to one of virtual network interfaces 426, which may have private network addresses defined by the customer operating the virtual network, is actually addressed to a private IP address associated with the network interface 418 of the server. As such, communication manager 402 receives data packets addressed to network interface 418 and, using the IP tunneling technologies, repackages the data packets for delivery to one of virtual network interfaces 426. To perform the data packet encapsulation and decapsulation required to implement IP tunneling, communication manager 402 may rely upon a mapping table or database that correlates the private network addresses associated with virtual network interfaces 426 to the public network addresses associated with network interface 418.

Within server computer system 400, memory 410 may provide a computer-readable storage medium for storing data (e.g., programs, code modules, instructions) that may provide the functionality of at least one embodiment of the present disclosure. Network interface 418 may include various network interfaces connected to server computer system 400. Network interface 418 may be a hardware, software, or combination thereof configured to receive and transmit communication data, such as data packets generated by one or more of virtual computer system instances 420, over network 406 to one or more other computing systems (not shown). Although only one network interface 418 is shown, multiple network interfaces 418 may be connected to server computer system 400 in accordance with the present disclosure.

Server computer system 400 may also include firewall 404 that is configured to permit or block network traffic based at least in part on one or more security policies provided by the customer or computing resource service provider. Firewall 404 may be implemented as hardware, software, or a combination thereof. For example, firewall 404 may include a kernel module configured to filter network traffic directed to virtual computer system instances 420 implemented by server computer system 400.

Server computer system 400 may include at least one logging system 408 configured to obtain log information, including but not limited to the log information described above. As data packets (or a group of related data packets, referred to as a communication flow) pass through server computer system 400 (e.g., via communication manager 402), logging system 408 can identify attributes of those communications and record those attributes, as network activity, into a log file (e.g., as described above with respect to FIGS. 1A-3). The log file may be local to system hardware 412 (e.g., stored within memory 410) or may be stored remotely (e.g., stored within one or more of virtual computer instances 420 or other data storage device accessible to system hardware 412). A particular log file may contain entries recording network activity of a single virtual computer system instance 420, or of all virtual computer system instances 420 executing on the server computer system 400, or of other virtual resources, or of the entire server computer system 400. Server computer system 400 may have multiple logging systems 408; all logging systems 408 may be executed by the communication manager 402, the CPU 414, and/or any other computing resource of the server computer system 400, or single logging systems 408 or subsets of logging systems 408 may be executed by different components of the server computer system 400, such as when each virtual computer system instance 420 has its own logging system(s) 408.

In various embodiments, the log information captured by logging system 408 includes identification information and some or all of the network activity of the computing resources (i.e., physical and/or virtual) associated with the identified customer, user, and/or resources, occurring within a logging period. Non-limiting examples of identification information include identifier(s) for user account and/or user group and/or VCE and/or VN and/or virtual resource(s) involved (e.g., virtual computer system instance 420; virtual network interface 426) and/or machine image or template used to launch virtual resources. For example, when a virtual machine is launched from a machine image, a hypervisor of the server computer system 400 may store the identifier of the machine image used to launch the virtual machine and/or an identifier of the instance itself (e.g., in memory 410), and the logging system 408 may obtain the identifier(s) from the storage location; or, the hypervisor may send the identifier(s) directly to the logging system 408. Non-limiting examples of network activity that can be recorded in the log information (e.g., as entries, associated with the identification information, in a log file) include virtual network driver information, activity source (e.g., IP address and ISP information 482 of a requesting device 484) and destination (e.g., IP address or identifier of virtual computer system instance 420), packet count, byte count, timestamp(s) corresponding to the start and/or end of the communication flow, and an action (e.g., communication accepted/allowed or denied/disallowed) performed by the firewall 404. The hypervisor can be programmed to make available to the logging system 408 the network activity information, identifying which communications are associated with a virtual machine (e.g., an identifier of a virtual network interface, a virtual IP address used by the virtual machine). As such, when the logging system 408 processes data packets it can match information in the packets to the information that identifies which communications are associated with the virtual machine and add the machine image or instance identifier to the record.

Thus, the logging system 408 can record all network activity from activity sources within a user's VCE (e.g., between virtual computer system instances 420) as well as from activity sources communicating with the server computer system 400 over the external communication network 406. In various non-limiting examples, including those described herein, the logging system 408 records all communications (e.g., each data packet or a flow of data packets between start and end times) to the server computer systems 400 hosting a virtual computing environment, arriving over the connected network 406, and originating from or sent to any individual computing device 480 or group of computing devices 484 (i.e., belonging to an identifiable group such as activity sources within an ISP 482, an organization, or a geo-location) engaging in malicious activity, as well as from any computing devices 490 engaging in normal and/or authorized activity. The resulting log information may be stored by the logging system 408 and retrieved by the threat intelligence system or another service of the computing resource service provider; or, the logging system 408 or another service of the computing resource service provider that has access to the log files can send the log files to the threat intelligence system. For example, a network-accessible services system of the computing resource service provider can be used to run various program codes on-demand using virtual computing resources provided by server computer system 400. The network-accessible services system may receive requests to execute program codes from a user, or from the threat intelligence service, without requiring that the user configure a particular virtual machine instance; rather, the program codes may each be associated with instances of one or more containers executed by a virtual machine instance, for example. In some embodiments, the network-accessible services system can receive the code to be executed (and/or identifying information of code to be executed) along with values for any necessary variables, can assign a VM instance to execute the code, and, in some cases, can provide output that is generated during execution of the code. In some embodiments, VM instances of a network-accessible services system may not be associated with a particular user, but may instead be used by many different users (simultaneously and/or serially) and/or by services of the computing resource service provider to execute program codes. In some embodiments, a network-accessible services system can be used to provide any suitable functionality described herein (e.g., parsing threat information, parsing log information, etc.).

Figure 5:
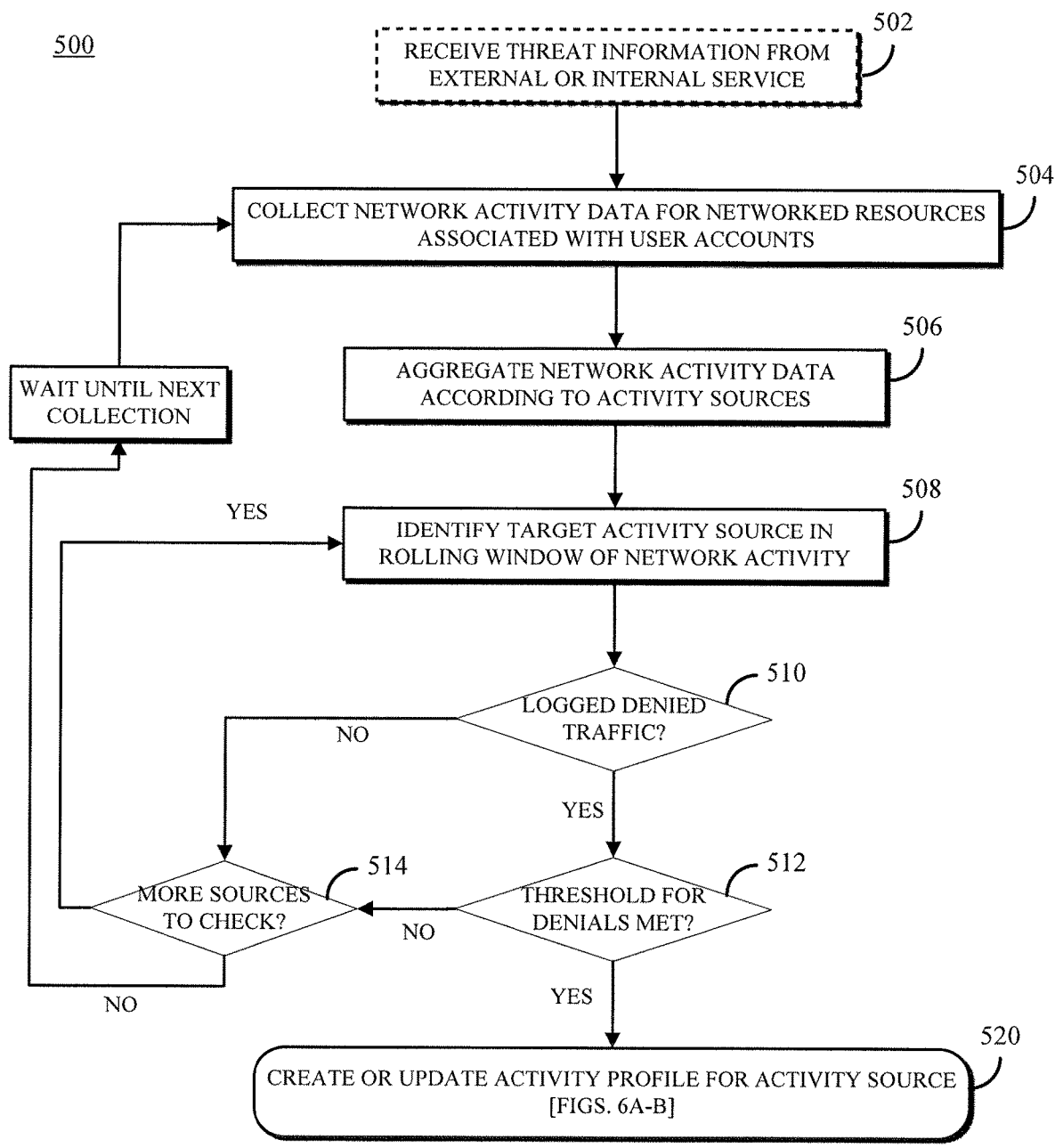
FIG. 5 is a flowchart of an example method for determining whether to create or update an activity profile in accordance with the present disclosure.

Referring to FIG. 5, a system for determining a threat level of an activity source may, in accordance with the disclosed embodiments, execute an example method 500 of determining whether an activity profile should be created and/or maintained for a particular activity source. Again, an activity source may be a computing device or group of computing devices engaging or attempting to engage in network activity with any of the monitored computing resources (e.g., VCEs, virtual computer system instances) of the computing resource service provider's computing environment. Optionally, at step 502, the system may first receive threat information from an external (i.e., to the computing environment, such as from a vendor or other third party service) or an internal service. For example, the system may receive the threat information from a security assessment service of the computing resource service provider, which had previously identified an activity source as a potential threat using any suitable threat detection means, such as deploying "honeypots" (i.e., virtual computing resources that attract malicious activity but have no connection to sensitive data or computing operations). The method 500 may, of course, be performed without receiving any pre-existing threat information.

At step 504, the system may collect network activity data for all of the computing resources being monitored. For example, all virtual computing resources executing in a VCE associated with one of the computing resource service provider's user accounts may be monitored; in other examples, only a critical subset of VCEs, or of computing resources implementing user data storage or other computing architecture, may be monitored. In various embodiments, the computing resources that must be monitored are those having network activity that represents a "complete picture" of the behavior of all or an identified subset of activity sources. In some embodiments, the network activity data may be generated (e.g., as log files) by various logging systems as described above, and may be encrypted and stored in a secure data storage system that only grants access to the data when the system provides corresponding security credentials. The system may provide these credentials and retrieve the network activity data. In other embodiments, the logging systems may encrypt and send the network activity data directly to the system. In still other embodiments, the system may itself monitor the resources and generate the network activity data. The network activity data that can be obtained at step 504 may represent all network activity occurring during a specified logging period, such as one minute, or five minutes, or one hour; different logging systems may have different logging periods, and the system may collect aggregated (or may collect and aggregate) log files for a particular resource, as described above.

At step 506, the system may aggregate the collected network activity data across all sources (i.e., virtual machine instances, or various logging systems) according to each activity source identified in the network activity data. In one example, the system collects (at step 504) a log file for each VCE in the computing environment, each log file describing all of the network activity for the VCE during the logging period. Begging with a first log file (or with the threat information received at step 502), the system identifies a target activity source, such as by obtaining an IP address from the "source" field of a log file entry. The system then obtains all entries in the first log file that include the target activity source as the source or destination of communications with the VCE associated with the first log file. Then, the system repeats this with all of the log files to obtain every entry identifying the target activity source as a source or destination of communications with any of the monitored VCEs. The system may transform these entries into a data capture, described further below, or another data structure that includes all of the important network activity data for the target activity source during the logging period. In this manner, the system can determine aspects of the target activity source's network activity, such as number and identification of VCEs (or, more granularly, of virtual machine instances within each VCE) engaging in communications with the target activity source, volume (e.g., number of bytes) sent and/or received to particular resources and/or across all resources, and whether each communication from the target activity source was allowed or disallowed by the receiving resource, the VCE, a network interface, etc.

The system may repeat the network data aggregation for all or a subset of the activity sources that appear in the network activity data, until the system has generated a data capture for each of the activity sources to be analyzed. In one example, all activity sources appearing in at least one entry of at least one log file may have their associated network data aggregated and a data capture produced therefor. In another example, the system may maintain a blacklist and/or a whitelist of network activity sources for which the system always and never, respectively, aggregates the network activity. At step 508, the system may again select a target activity source having an associated data capture for the corresponding logging period, and may expand the associated network activity data to include all network activity of the target activity source within a rolling time window. In some embodiments, the rolling time window is longer than the logging period, and further may include a predetermined number of logging periods. For example, the logging period may be one hour and the rolling window may include the most recent 24 consecutive logging periods. The system may store all of the data captures, for all of the activity sources, which have been generated over the rolling window, including the newly generated (at step 506) data capture. Alternatively, the system may store an aggregate capture of each activity source, including the important network data accumulated over the rolling window.

Upon identifying the target activity source within the network activity data of the rolling window, at step 510 the system may determine whether the network activity data describes any denied traffic, such as disallowed requests for access to a virtual machine instance, that is associated with the target activity source over the rolling time window. For example, the system may obtain the data captures (or aggregate capture) and search them for log entries showing a firewall activity as "DENIED." Such data may include a volume of denied traffic, a number of denied requests, a number and/or identifiers of VCEs or associated user accounts that have denied requests from the target activity source, and the like. Alternatively, the system may query a data storage service storing the data captures (or aggregated capture) to return a "yes/no" response as to whether the associated data captures include any denied activity. In other embodiments, the system may not perform steps 510 and 512 and may instead create activity profiles for all activity sources, not just activity sources that have at least some denied traffic.

If there has been no denied activity over the rolling window, then in some embodiments there is no need to create or update an activity profile for the target activity source (i.e., the target activity source is authorized, or at least not potentially malicious). Thus, the system proceeds to step 514, determining whether there are more activity sources from the most recent logging period to check for denied activity. If so, the system returns to step 508 to identify the next target activity source. If all activity sources have been checked, the system may wait for the next logging period to elapse (or the next threat information to be received), and then begin again at step 504.

If the system determines (at step 510) that denied traffic for the target activity source was logged, at step 512 the system may, in some embodiments, use the denied activity data to determine whether the denied traffic meets a predetermined threshold for denied network activity. For example, the predetermined threshold may be one or more parameter-value pairs that together differentiate denied activity as either accidental/benign (the threshold is not met) or potentially malicious (the threshold is met or exceeded). In some embodiments, the threshold is described by a traffic volume or number of denied requests (e.g., five denied requests in the rolling window) coupled with a number of independent user accounts associated with the resources that denied activity. A user account is "independent" if it is not controlled by any other user account denying activity. Examples of "control" in this context include: a user account is a sub-account of a master account; user accounts belong to the same control group; user accounts have the same contact information; user accounts have the same billing address. A minimum number of denied requests is selected to reflect a threshold at which the target activity source's denied activity is more likely to be malicious (e.g., an attempt to gain unauthorized access) than accidental or benign (e.g., a misconfigured resource or misdirected request). A maximum number of independent user accounts is also selected to reflect a differentiating threshold at which the target activity source's denied activity is more likely to be malicious (e.g., a directed attack at one or very few independent user accounts) than accidental or benign (e.g., a port scan of all resources). In some embodiments, the threshold number of independent user accounts may be zero; thus, denied traffic may occur across multiple dependent user accounts of a target user account without meeting the threshold, but once denied traffic is identified for one independent user account not associated with the target user account, the threshold is met. In other embodiments, the threshold may be set at a low number (e.g., a maximum of 1-3, inclusive) and/or may be set by user input as described above.

The system may compare data describing the denied activity to the thresholds. For example, the number of denied requests and the total number of independent user accounts affected may be stored in the aggregate capture for the activity source (e.g., calculated and stored by the system at step 506), and the system may simply obtain the corresponding values from the aggregate capture. In another example, the system may obtain some or all of the information in data entries for each of the denied requests in order to determine the number of denied requests and the total number of independent user accounts affected. If the threshold is not met (e.g., the target activity source originated less than five denied requests or had requests denied by resources of more than two independent user accounts), the system does not create or update an activity profile and instead determines whether there are more activity sources to check (step 514). If the threshold is met (e.g., the target activity source originated at least five denied requests across resources of at most two independent user accounts), then at step 520 the system proceeds to create or update an activity profile associated with the target activity source.

Figure 6A:
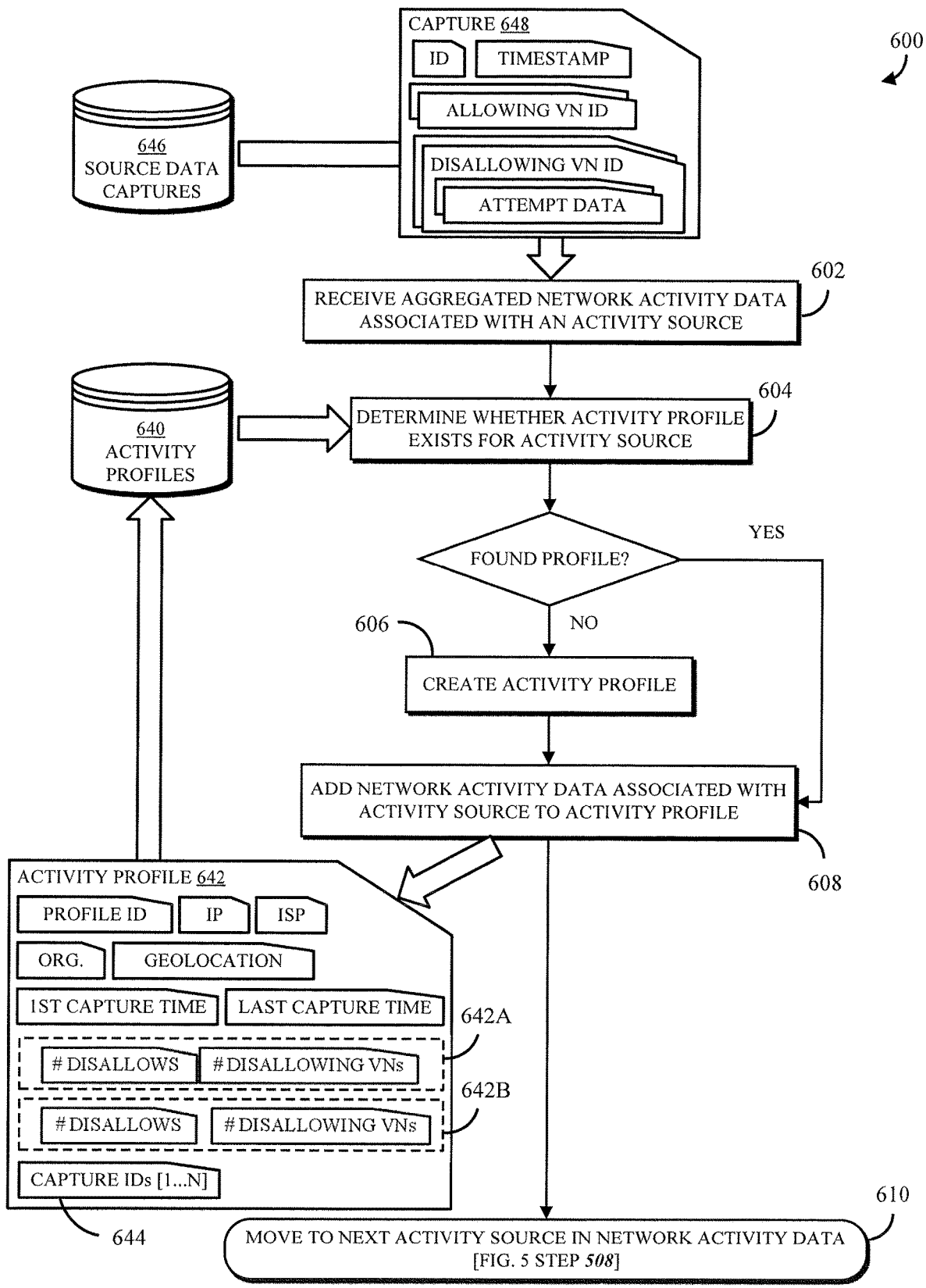
FIG. 6A is a flowchart of an example method for creating or updating an activity profile in accordance with the present disclosure.

FIG. 6A shows an example method 600 for creating or updating an activity profile 642. At step 602, the system may receive or obtain the network activity data for a target activity source, aggregated across all monitored resources and occurring during the logging period, as in step 506 of FIG. 5. In some embodiments, the aggregated network activity data for a logging period may be represented by a data capture 648, which may be a data structure, file, database record, or another structured collection of data elements. In some embodiments, the data captures 648 may be stored versions of the aggregated network activity data for the corresponding logging period, and may contain all of the corresponding tracked data elements. In other embodiments, each data capture 648 may store only a subset of the tracked data elements. A data capture 648 may include, for example, parameter/value pairs describing the network activity for the activity source during the logging period. The activity may include raw data associated with all of the activity by the activity source, and/or may be aggregated as described above, such that the data capture 648 identifies all of the virtual networks/VCEs that disallowed any of the source activity's data transmissions; the data capture 648 may further include information about the attempted data transmissions that were denied, such as volume of data transmitted, contents of data packets, ports and/or protocols used, and the like. The data capture 648 may further identify all of the virtual networks/VCEs that allowed any traffic from the activity source. Data captures 648 may be stored in any suitable data store, such as the threat intelligence data store described above, the data store 640 storing the activity profiles, or one or more dedicated data stores 646 for storing data captures.

At step 604, the system may determine whether an activity profile 642 already exists for the target activity source. For example, the system may access a storage location, such as a threat intelligence data store as described above, or an activity profile data store 640 stores the activity profiles. The system may query the activity profile data store 640 for an activity profile associated with an identifier of the target activity source. If there is an existing activity profile

642, the system may proceed to step 608. If not, at step 606 the system may create an activity profile 642 for the target activity source. For example, the system may cause the activity profile data store 640 to create a new record for containing the activity profile 642, or the system may create a temporary data structure (e.g., in memory) for storing the activity profile 642 until it is ready to be sent to the activity profile data store 640 and stored as a record.

FIG. 6A illustrates an example data structure of an activity profile 642. In various embodiments, the activity profile 642 for an activity source may include identifying parameters as well as information describing the network activity of the associated activity source. Non-limiting examples of identifying parameters may include a profile identifier and one or more identifiers associated with the activity source's network location, such as an IP address, an ISP, an organization, and/or a geolocation (e.g., region, city). Typically, the IP address may be obtained from the log information (e.g., the "source" field of a log file entry); other identifiers such as the ISP, organization, and geolocation may be obtained from one or more databases available to the system and storing such information about network locations. The information describing the network activity may have a wide range of granularity, from historically aggregated parameter values down to individual data elements of each logged request. Non-limiting examples include: a timestamp reflecting the time of the first logging period entered into the activity profile 642; a timestamp reflecting the time of the last logging period entered into the activity profile 642; rolling window aggregated values 642A for number of disallowed requests and/or number of VCEs, VNs, or VMs disallowing traffic; historical values 642B (i.e., for the entire time the activity source has been tracked, which may be longer than the rolling window) values for number of disallowed requests and/or number of VCEs, VNs, or VMs disallowing traffic; and, data captures 648, or references thereto, for one or more logging periods, each including a data structure storing values describing the activity source's network activity during the corresponding logging period. In some embodiments, the activity profile 642 may store the entire data structure of all of the data captures 648 generated for the corresponding activity source during the rolling window. In other embodiments, including as illustrated, the activity profile 642 may include an array 644 or other data structure containing identifiers for the associated data captures 648, and the system uses the values in the array to retrieve the data captures 648 (e.g., from the data store 646) as needed.

At step 608, the system may add all or a relevant portion of the aggregated network activity data (from step 602) to the activity profile 642. For example, the system may incorporate the values from the associated logging period into any stored aggregate parameter values in the activity profile 642, and may store an identifier for the data capture 648 in the array 644, or may create a data structure for the capture data 648 and store it in the activity profile 642. The new or updated activity profile 642 may then be stored in the activity profile data store 640. At step 610, the system may continue to process activity sources of the associated logging period, such as by returning to step 508 of FIG. 5.

In some embodiments, the system may be configured to track activity generated from a particular source network, in addition to or instead of tracking individual activity sources. Thus, an activity source evaluated by the present systems may be an entity representing a communication network or a group of networked computers that engages in network activity with the VCEs of the computing resource service provider; such an entity is referred to herein as a "source group," the constituents of which include a plurality of activity sources that each would, or does, have a corresponding activity profile. A source group may be an ISP, an organization, a network, subnet, VN, or other division of a network, a geographic region, or another suitable grouping of computing devices where the group can be identified from the network activity aggregated as described herein.

Figure 6B:
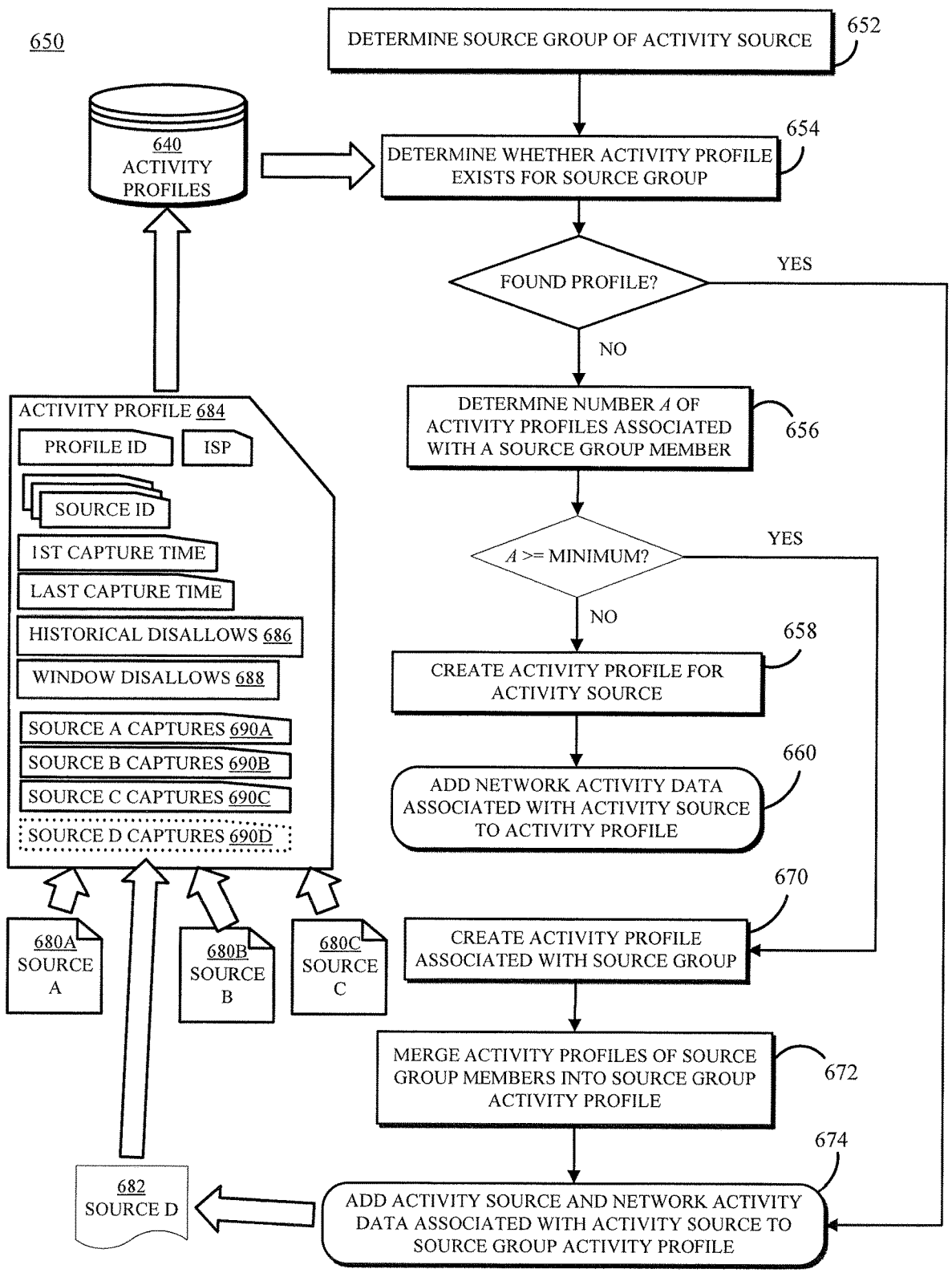
FIG. 6B is a flowchart of an example method for merging individual activity profiles into a group activity profile.

FIG. 6B illustrates an example method 650 for creating and/or updating an activity profile 684 for a source group. In some embodiments, the system may begin performing the method 650 in the course of performing other network activity analysis, such as the method 600 of FIG. 6A; the illustrated method 650 presumes that an individual activity source has been identified in connection with one or more data captures describing the activity source's network activity during the corresponding logging period(s). At step 652, the system may determine that the activity source being analyzed belongs to a particular source group. For example, the system may analyze raw activity data or submit queries against the data capture's data structure for known parameters, such as the ISP of the activity source. In another example, the system may obtain the activity source's IP address and use it to query external databases containing publicly available data about the networks and subnets implicated by the composition of the IP address.

At step 654, the system may use an identifier of the source group (i.e., determined in step 652) to query the activity profile data store 640 to obtain an existing activity profile for the source group. If there is already an activity profile for the source group, the system may proceed to step 674, described below. If not, at step 656 the system may determine whether a threshold has been met for creating a group activity profile to represent the activity sources belonging to the group. For example, the system may store (e.g., in memory), a threshold value representing a minimum number of activity sources that belong to the source group and have an associated activity profile. If the system has not profiled at least the minimum number of activity sources, then at step 658 the system may create an individual activity profile for the activity source and, at step 660 add the aggregated network activity data into the new activity profile, as described above with respect to FIG. 6.

If there are activity profiles for at least the minimum number of activity sources in the source group, at step 670 the system may create an activity profile 684 associated with the source group. In some embodiments, the system may store in the group activity profile 684 all of the information that would otherwise be stored in an individual activity profile, including identifiers, relevant time stamps, and other descriptive elements, as well as aggregated historical values 686 and current time window values 688 for disallowed traffic, as described above. Additionally, a group activity profile 684 may include identifiers for each of the activity sources that are represented by the group activity profile 684. In some embodiments, the activity sources identified may include all of the group members that had (or should have had) an activity profile created and maintained for them individually. The group activity profile 684 may further include the aggregated activity data, for the logging periods in the rolling time window, of all of the activity sources that the activity profile 684 identifies. In some embodiments, the activity profile 684 may include the data captures of all of the member sources. Alternatively, the system may merge the data captures of the member sources for each logging period to produce a set of group activity captures, which may be stored in the activity profile 684 or in another data store as described above. In another embodiment, as illustrated, the activity profile 684 may include an array 690A, B,C,D that contains identifiers for the stored data captures of each of the activity sources.

When the group activity profile 684 is first created (step 670), some of the individual activity sources A-C to be represented by the activity profile 684 may have activity profiles 680A,B,C of their own. At step 672, the system may merge the activity profiles 680A-C into the group activity profile 684, such as by copying the data from the activity profiles 680A-C to the group activity profile, or by storing the profile identifier of each of the activity profiles 680A-C in the group activity profile 684, and then recalculating any aggregated values. In some embodiments, the merging step may include merging the data associated with the activity source being evaluated (i.e., SOURCE D in FIG. 6B) into the group activity profile 684. In another embodiment, at step 674 the system may, after merging the existing activity profiles 680A-C, add the identifier and the network activity data of SOURCE D to the group activity profile 684 (e.g., store the ID of data capture 682 in the array 690D), recalculate any aggregated values, and store the group activity profile 648, in the activity profile data store 640. Subsequently, the group activity profile 684 may be evaluated while calculating a threat level score in the same manner as any individual activity source's activity profile, as described further below; if a source group is identified as a threat actor, any activity source that is a constituent of the source group may also be treated as a threat actor.

Figure 7:
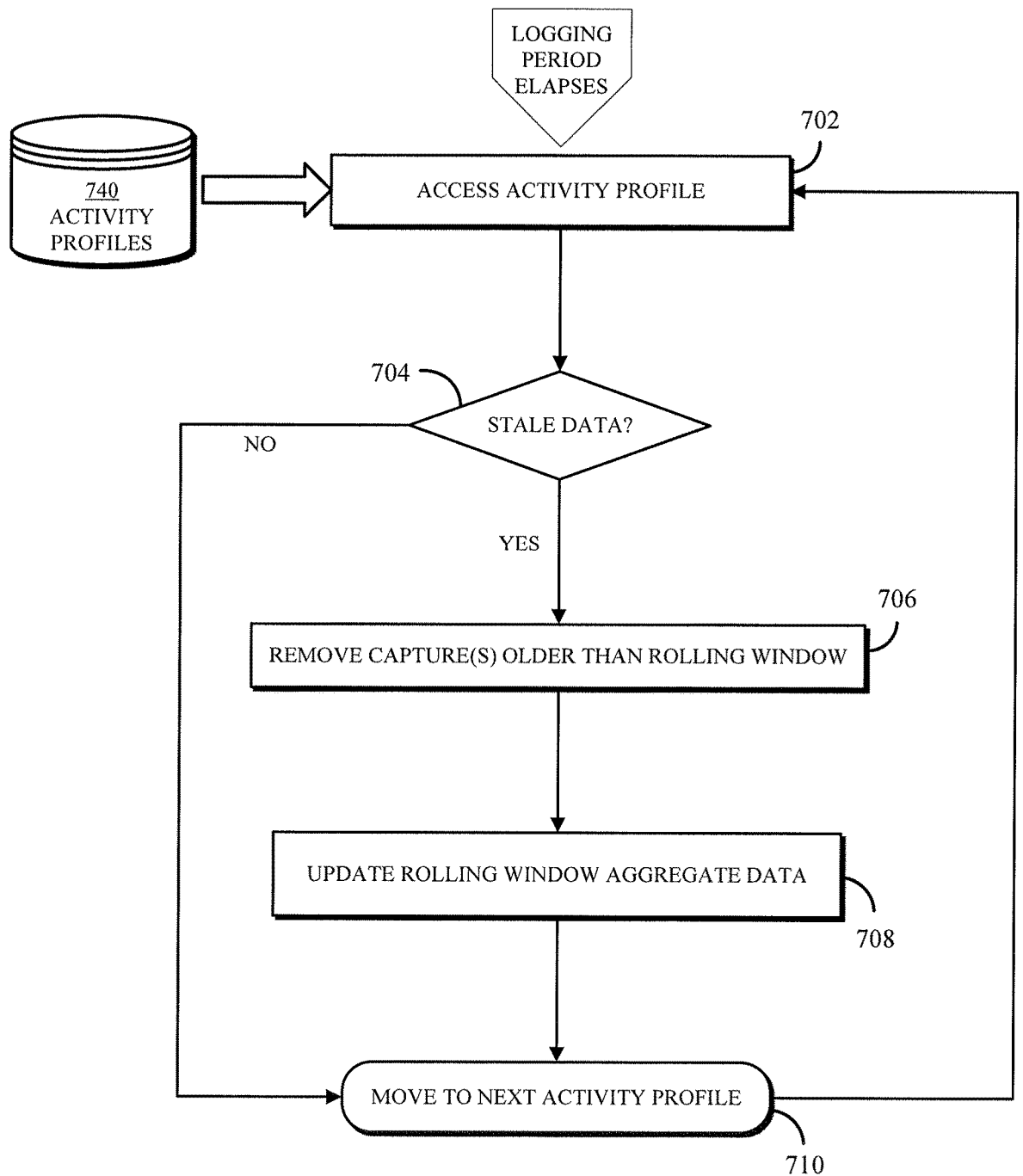
FIG. 7 is a flowchart of an example method for maintaining an activity profile in accordance with a rolling window of network activity.

Referring to FIG. 7, an example method 700 for updating activity profiles may be used to track network activity over a rolling window of a predetermined length. As described above, the rolling window may correspond to a certain number of the most recent consecutive logging periods, such as 24 one-hour logging periods. Thus, once the monitoring data of an entire window's worth of logging periods has been aggregated in an activity profile, the oldest data capture may be considered stale and marked for removal at the end of the next logging period. The system may receive a signal or may otherwise determine (e.g., by monitoring an internal clock) that a logging period has just elapsed. For example, if the logging period is one hour and begins at the top of the hour, the system may initiate the method 700 at the top of every hour. Then, at step 702, the system obtains an activity profile from the data store 740 where the activity profiles are maintained. At step 704, the system may determine whether the retrieved activity profile contains data that is now stale. For example, in a 24 hour rolling window, any data captures having a timestamp that is more than 24 hours in the past may be considered stale data eligible to be removed from the activity profile. In an embodiment where the data captures are stored in the activity profile, the system may check the timestamps stored in each data structure to determine whether any of the data is stale. In an embodiment where the data captures are referenced, such as with an array of data capture identifiers as described above, the system may determine the time that the identifiers were added to the activity profile, or may retrieve the associated data captures and check their timestamps, or obtain another value from the parameters of the activity profile that indicate the timestamp (s) of data stored in the activity profile.

If there is no stale data in the activity profile, the system may move to the next activity profile (step 710, returning to step 702); this loop may proceed until all activity profiles have been checked for stale data. If there is data that is stale—i.e., is older than the time window—at step 706 the system may remove the stale data. For example, the system may delete each data capture, or the identifier thereof (i.e., from an array as described above), that is older than the rolling window. The actual data of the data capture may be retained in a separate data store, but it is no longer referenced in the activity profile except insofar as the activity profile maintains historical aggregated values, as described above. At step 708, the system may update the aggregated parameter values to account for the removal of one or more data captures from the activity profile. In one example, the system may obtain the values of the tracked parameters from the data capture to be deleted, and use the values to update the aggregated parameter values. The recalculation of aggregated parameter values may be done in conjunction with adding a new data capture's parameter values as the data capture, if any, is added to the activity profile. Once the aggregated data for the rolling window is updated, at step 710 the system may obtain the next activity profile (i.e., return to step 702) or terminate the method 700 if all activity profiles have been checked.

Figure 8:
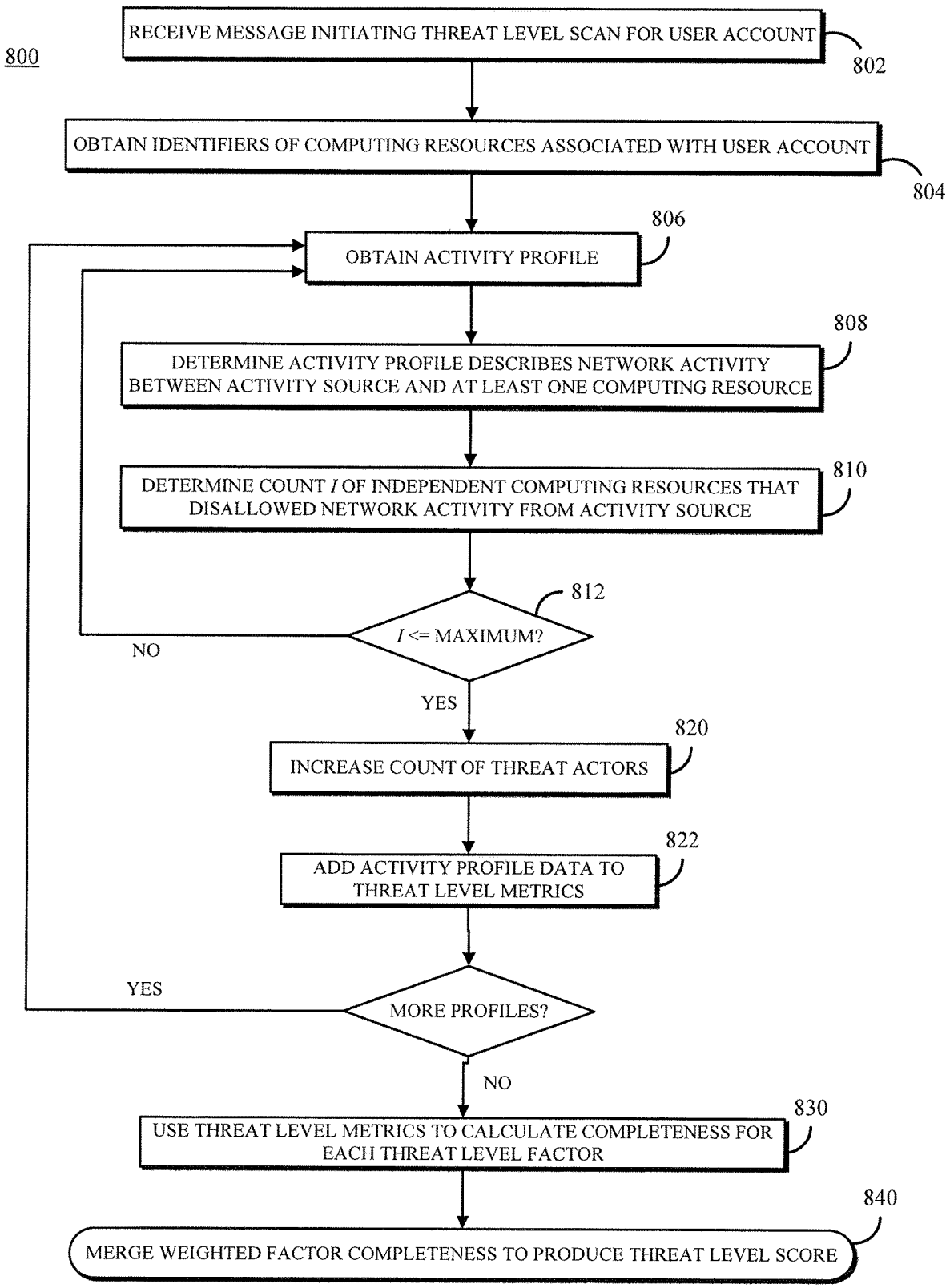
FIG. 8 is a flowchart of an example method for determining a threat level score in accordance with the present disclosure.

FIG. 8 illustrates a method 800 of determining a threat level score associated with an activity source or source group, with respect to a particular user account. In some embodiments, a threat level scan may evaluate only a single activity source's threat level against a single user account. The illustrated and described embodiments contemplate evaluating any number of activity sources as potential threats, based on the existence of an activity profile associated with the activity source. At step 802, the system receives a message that initiates a threat level scan. The message may be scheduled, or may be generated by the owner of the user account being analyzed, or may be triggered by an event, such as the detection of certain network activity, or the receipt by the system of threat intelligence from another entity. The message may be a broadcast message that initiates a threat level scan for multiple, even all, user accounts of the computing resource service provider; in some embodiments, the threat level scan is a scheduled event occurring at a predetermined interval and evaluating all user accounts that have subscribed to the threat level detection service of the computing resource service provider.

At step 804, the system may obtain one or more identifiers for virtual computing resources associated with the user. User resources may include individual instances, such as virtual machine instances, as well as grouped resources such as a VN or a VCE. The identifiers correspond to the virtual computing resources that should be included in the scan. In one embodiment, at step 806 the system may obtain an activity profile, and at step 808 the system may determine that the activity profile identifies (e.g., contains an identifier of) a user resource that had network activity with the activity source associated with the profile. In another embodiment, the system may use the identifiers of the user resources to search the activity profile data store and obtain an activity profile that identifies any of the user resources as having network activity with the corresponding activity source of the activity profile. For example, the activity profiles may be stored in a distributed database, and the system may query the database service using each of the user resource identifiers to receive activity profile identifiers for activity profiles that include any of the user resource identifiers in their list(s) of VCEs or virtual computing resources that allowed and/or denied traffic from the activity source.

At step 810, based on the aggregated parameters and/or the data captures in the activity profile, the system may determine a count I of "independent" computing resources that disallowed at least some traffic of the activity source associated with the activity profile. For example, the activity profile may maintain a list (e.g., an array of identifiers) of VCEs that disallowed traffic from the activity source; the system may correlate each of the identified VCEs with their corresponding user account, and for each VCE that belongs to a user account that is not owned by the owner of the user account being evaluated, the system may increment the count I. This value tracks the expansiveness of the activity source's disallowed traffic; if there are too many independent computing resources impacted by the activity source, the system determines that the activity source is not conducting a directed attack against the user resources. Thus, at step 812 the system may determine, after counting how many independent VCEs/computing resources have been engaged by the activity source, whether that count is within or exceeds a threshold maximum number of independent resources. The threshold maximum number is selected to represent a distinction between a directed attack (i.e., no more than the threshold maximum number of independent resources disallowed traffic) from the activity source, and a less threatening mass communication, such as a port scan, from the activity source. If the count I exceeds the threshold, the activity source is considered not a threat/threat actor, and the system may return to step 806 and obtain the next activity profile to evaluate.

If the count I does not exceed the threshold, the system may consider the activity source associated with the activity profile to be a threat actor, and at step 820 the system may increase a count of threat actors being maintained for the present evaluation. Additionally, the system may, at step 822, add the values of the relevant parameters from the activity profile and associated data captures to a running aggregate of threat level metrics that will be used to calculate the threat level score. In some embodiments, only certain data is needed to calculate the threat level score, which may be divided into multiple factors as described above. For example, the threat level score factors and associated data may include, without limitation: the number of threat actors identified from the activity profiles, tracked at step 820; a total number, or total percentage, of the user resources that received traffic from the activity source, tracked using the lists of user resource identifiers stored in the activity profiles and/or in the data captures; a total volume of disallowed traffic by the virtual computing resources of any user account, which may be an aggregated parameter stored in the activity profile, or may be acquired by parsing the data captures associated with the activity profile; a total number of ports that the activity source attempted to access, which may be an aggregated parameter stored in the activity profile, or may be acquired by parsing the data captures associated with the activity profile; and, a total number of protocols used by the activity source in its data communications, which may be an aggregated parameter stored in the activity profile, or may be acquired by parsing the data captures associated with the activity profile. Additionally or alternatively, the system may use, as a factor of the threat level score, the number of distinct data sources reporting that the activity source has disallowed communications or is a potential threat actor for other reasons. Data sources that may be considered distinct include, without limitation: the system itself, via network activity analysis of the user resources as described herein; the system again, counted a second time or more times depending on historical data indicating past identification of the activity source as a threat actor against the user account or other user accounts; each external source, such as a vendor or another threat intelligence system, that sends to the system threat information identifying the activity source; and, each internal source other than the system, such as a threat assessment service that identifies the activity source as a potential threat actor. The system may receive and store the necessary information to count the number of distinct data sources, such as by storing and/or tabulating threat information received from external and internal sources.

If the system has not evaluated all of the activity profiles, in some embodiments the system may return to step 806 to obtain the next activity profile in the database and evaluate it. If all, or a desired subset, of the activity profiles have been scanned, the system may proceed to calculate the threat level score. In some embodiments, the system may use the raw threat level metrics obtained in the previous steps to determine the threat level score. In other embodiments, the system may normalize the metric data, such as by averaging, removing extreme highs and lows for parameter values, and the like. As illustrated, in some embodiments the system may, at step 830, calculate a "completeness" for each of the factors being evaluated to compose the threat level score. The completeness may be determined with respect to a preset maximum value for each of the factors; if the measured value of the corresponding metric meets or exceeds the preset maximum value, the completeness of the corresponding factor is 100%, while the system calculates and uses the percentage when the measured value falls below the preset maximum value. For example, if the preset maximum number of ports is five, a threat actor trying to use five or more ports will have 100% completeness for the factor, indicating a maximum threat level with respect to attempted ports of access; if the threat actor tried to use three ports, the system calculates 60% completeness for the factor. Non-limiting example preset maximum values for the example threat level score factors include: for distinct threat actors, two or three; for number or percentage of virtual resource instances accessed, 2% of instances, up to 20 instances; for number of communication ports, five; for number of protocols used, three; for volume of disallowed data, no more than two standard deviations from a measurement of baseline levels of activity for the user resources over the time window; and for number of discrete data sources, two.

The completeness may be expressed as a percentage, or as a numeric value on a desired scale, such as zero to one, inclusive. At step 840, the system may further apply a weight scalar to each of the factors in the threat level score calculation. The weights, as well as the maximum values for completeness calculation, may be set by user input, or may be preset defaults of the system. In one example, the factors may be equally weighted (i.e., 20% each when there are five factors). In another example, some factors may have a higher weight than others, such as when the number of threat actors and the number of user resources received traffic each have a value of, e.g., 25%, while the other factors are reduced accordingly. The system may the sum the weighted values for each factor to produce the threat level score. In one embodiment, the threat level score is between zero and one and may be expressed as a percentage.

Figure 9:
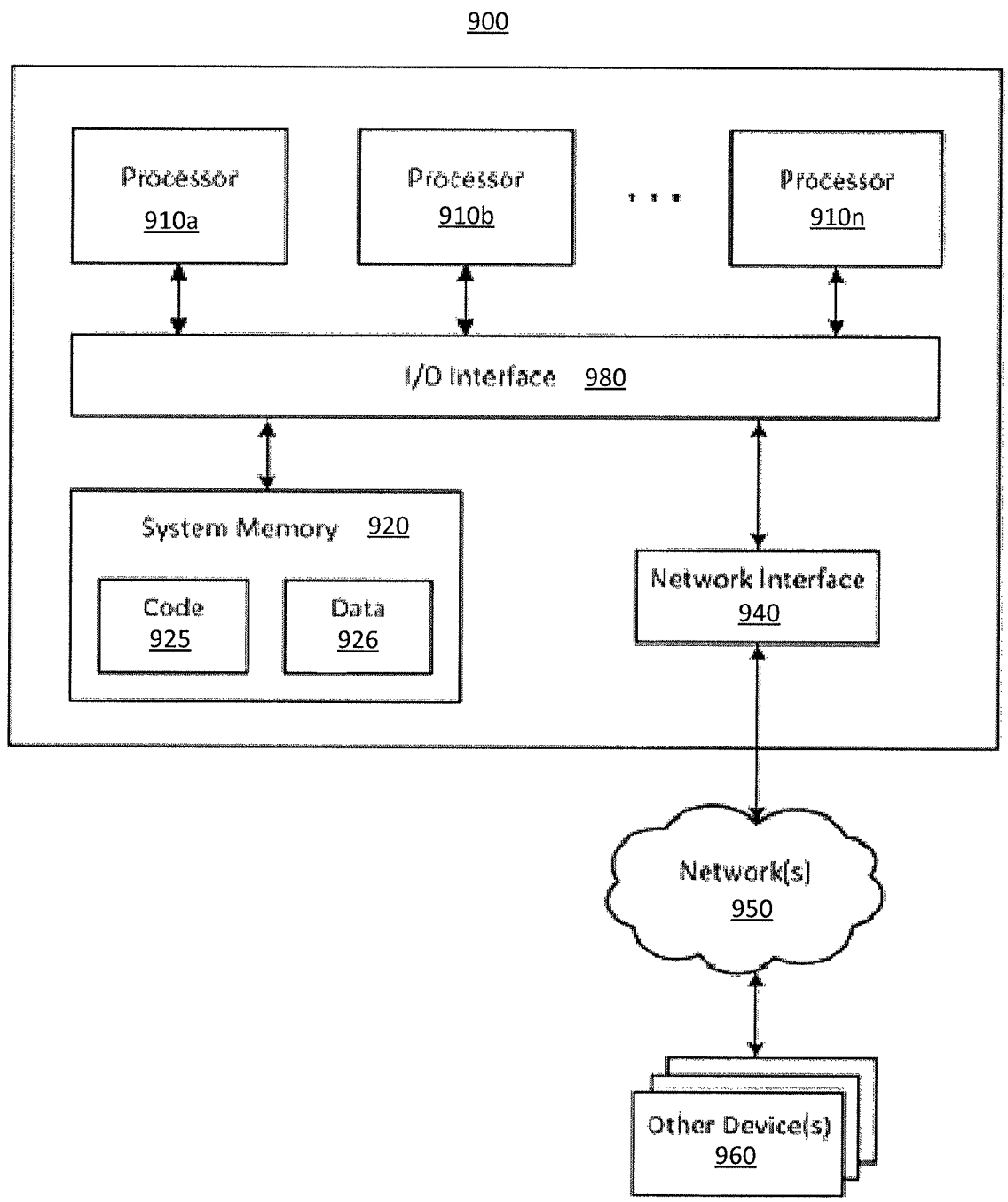
FIG. 9 is a block diagram depicting functional components of a general-purpose computing device.

In at least some embodiments, a computing device that implements a portion or all of one or more of the technologies described herein, including the techniques to implement the functionality of a system for logging network traffic within a multi-tenant environment can include a general purpose computer system that includes or is configured to access one or more computer-accessible media. FIG. 9 illustrates such a general-purpose computing device 900. In the illustrated embodiment, computing device 900 includes one or more processors 910*a*, 910*b*, and/or 910*n* (which may be referred herein singularly as "a processor 910" or in the plural as "the processors 910") coupled to a system memory 920 via an input/output (I/O) interface 980. Computing device 900 further includes a network interface 940 coupled to I/O interface 980.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, Power PC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods techniques, and data described above, are shown stored within system memory 920 as code 925 and data 926.

In one embodiment, I/O interface 980 may be configured to coordinate I/O traffic between processor 910, system memory 920, and any peripheral devices in the device, including network interface 940 or other peripheral interfaces. In some embodiments, I/O interface 980 may perform any necessary protocol, timing, or other data transformations to convert data signals from one component (e.g., system memory 920) into a format suitable for use by another component (e.g., processor 910). In some embodiments, I/O interface 980 may include support for devices attached through various types of peripheral buses, such as a variant of the Peripheral Component Interconnect (PCI) bus standard or the Universal Serial Bus (USB) standard, for example. In some embodiments, the function of I/O interface 980 may be split into two or more separate components, such as a north bridge and a south bridge, for example. Also, in some embodiments some or all of the functionality of I/O interface 980, such as an interface to system memory 920, may be incorporated directly into processor 910.

Network interface 940 may be configured to allow data to be exchanged between computing device 900 and other device or devices 960 attached to a network or network(s) 950, such as other computer systems or devices as illustrated in FIGS. 1, 2, and 6, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fiber Channel SANs or via any other suitable type of network and/or protocol.

In some embodiments, system memory 920 may be one embodiment of a computer-accessible medium configured to store program instructions and data for implementing embodiments of the present methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 900 via I/O interface 980. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic or digital signals, conveyed via a communication medium such as a network and/or a wireless link, such as may be implemented via network interface 940. Portions or all of multiple computing devices, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements change over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, up-front cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager. Such an interface may include capabilities to allow browsing of a resource catalog and details and specifications of the different types or sizes of resources supported and the different reservation types or modes supported, pricing models, and so on.

Figure 10:
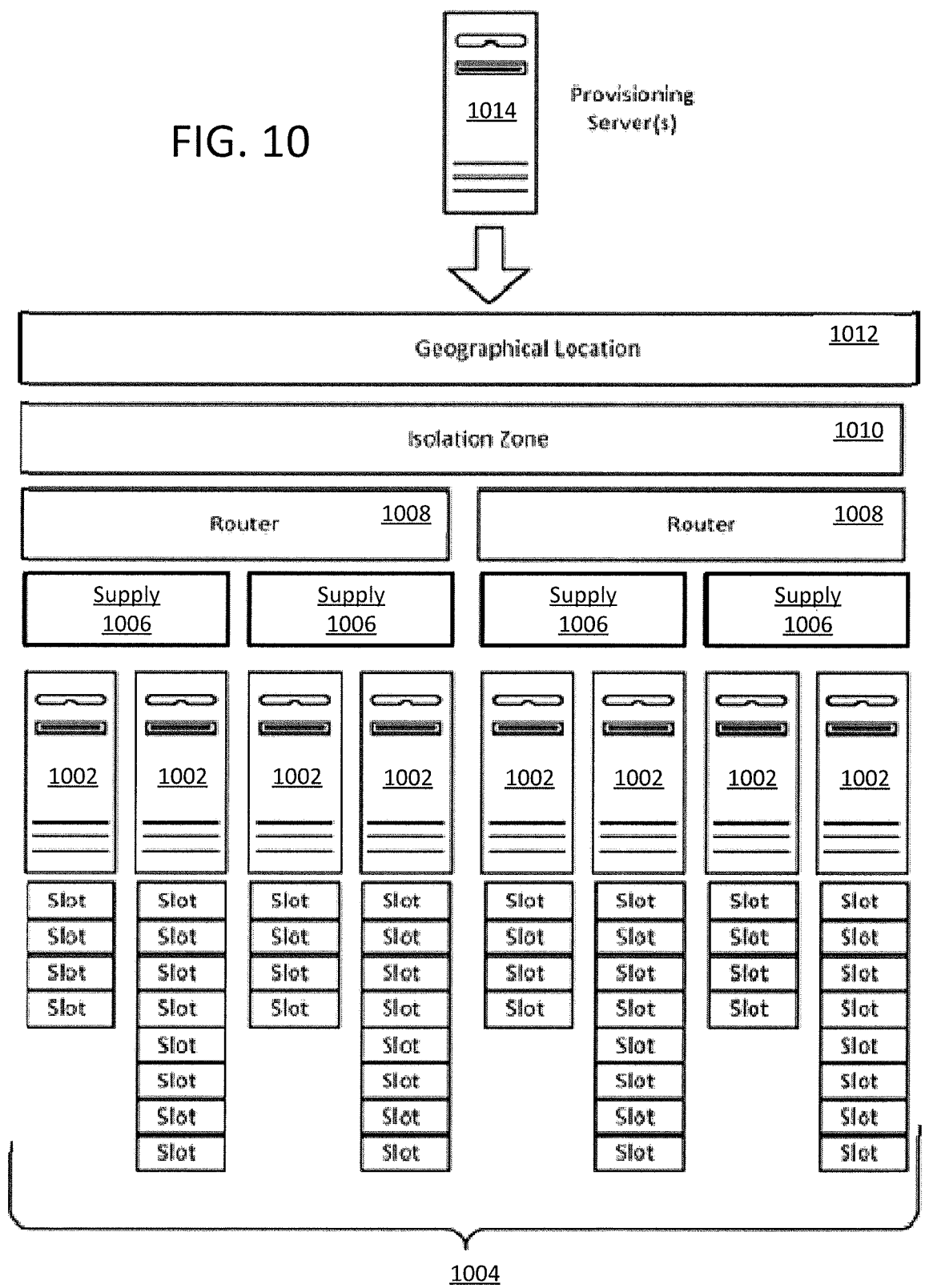
FIG. 10 is a block diagram depicting functional components of a data center.

In some embodiments, such as in FIG. 10, a data center 1000 may be viewed as a collection of shared computing resources and/or shared infrastructure. For example, as shown in FIG. 10, a data center 1000 may include virtual machine slots 1004, physical hosts 1002, power supplies 1006, routers 1008, isolation zone 1010, and geographical location 1012. A virtual machine slot 1004 may be referred to as a slot or as a resource slot. A physical host 1002 may be shared by multiple virtual machine slots 1004, each slot 1004 being capable of hosting a virtual machine, such as a guest domain. Multiple physical hosts 1002 may share a power supply 1006, such as a power supply 1006 provided on a server rack. A router 1008 may service multiple physical hosts 1002 across several power supplies 1006 to route network traffic. An isolation zone 1010 may service many routers 1008, the isolation zone 1010 being a group of computing resources that may be serviced by redundant resources, such as a backup generator. Isolation zone 1010 may reside at a geographical location 1012, such as a data center 1000. A provisioning server 1014 may include a memory and processor configured with instructions to analyze user data and rank available implementation resources using determined roles and shared resources/infrastructure in the calculation. The provisioning server 1014 may also manage workflows for provisioning and deprovisioning computing resources as well as detecting health and/or failure of computing resources.

A provisioning server 1014 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 1002 that shares a router 1008 with a second system may be more proximate to the second system than to a third system only sharing an isolation zone 1010. Depending on an application, it may be desirable to keep the distance low to increase throughput or high to increase durability. In another embodiment, the distance may be defined in terms of unshared resources. For example, two slots 1004 sharing a router 1008 may have a distance of a physical host 1002 and a power supply 1006. Each difference in resources may be weighted differently in a distance calculation.

A placement calculation may also be used when selecting a prepared resource to transfer to a client account. In one embodiment, a client requests a virtual machine having an operating system. The provisioning server 1014 may determine that the request may be satisfied with a staged volume in a slot 1004. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 1014 may determine that a placement near other existing volumes is desirable for latency concerns. Therefore, the decision may find that sharing a router 1008 is desirable but sharing a supply 1006 and physical host 1002 is undesirable. A volume in the pool may then be selected that matches these attributes and placed preferably on a same router 1008 as the other volumes but not the same physical host 1002 or power supply 1006. In other examples of placement decisions, such as those relating to a database shard, sharing of infrastructure may be less desirable and a volume may be selected that has less infrastructure in common with other related volumes.

Although subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It should be understood that the above described steps of the processes of FIGS. 5-7 can be executed or performed in any order or sequence not limited to the order and sequence shown and described in the figures. Also, some of the above steps of the processes of FIGS. 5-7 can be executed or performed substantially simultaneously where appropriate or in parallel to reduce latency and processing times.

Therefore, as contemplated and described above, the present disclosure provides a system including one or more hardware computing devices including a processor and memory storing specific computer-executable instructions. In one embodiment, the instructions, when executed by the processor, cause the system to: receive first log information of a plurality of virtual computing environments each associated with a corresponding user account of a plurality of user accounts of a computing resource service provider, and each executing one or more user-specific virtual computing resources in accordance with a corresponding security configuration, the first log information describing network activity occurring, during a first time frame, between any of a plurality of activity sources and any of the plurality of virtual computing environments; transform the first log information to produce a first data capture that describes the network activity associated, in the first log information, with a first activity source of the plurality of activity sources; associate the first data capture with a first activity profile associated with the first activity source; receive user data identifying a first virtual computing environment, of the plurality of virtual computing environments, that is associated with a first user account of the plurality of user accounts; determine that the first activity profile identifies the first virtual computing environment and describes the network activity between the first activity source and the first virtual computing environment; determine, from the first activity profile, a count including each of the plurality of virtual computing environments that is not associated with the first user account, and that denied at least some of the network activity from the first activity source; determine that the count is less than or equal to a maximum number that is a differentiator between mass scanning activity and directed attack activity; compare information in the first activity profile to a plurality of threat factors to produce a threat level score representing a threat of the first activity source to the one or more user-specific virtual computing resources associated with the first user account, the plurality of threat factors selected to differentiate between directed attack activity and abnormal benign activity; and, perform a first action associated with the threat level score.

The system may further include an electronic data store in communication with the one or more hardware computing devices and configured to store a plurality of activity profiles including the first activity profile. The instructions, when executed by the processor, may further cause the system to, before associating the first data capture with the first activity profile: receive a first threshold representing a minimum volume of denied network activity of a given activity source in order to cause a corresponding activity profile of the plurality of activity profiles to be generated for the given activity source, the first threshold including a requirement that the denied network activity be directed to at least two of the plurality of virtual computing environments that are associated with different user accounts; determine that the first log information indicates that first denied network activity of the first activity source exceeds the first threshold; create the first activity profile to include a source identifier of the first activity source; and, store the first activity profile in in the electronic data store. To associate the first data capture with the first activity profile, the instructions, when executed by the processor, may further cause the system to store a capture identifier of the first data capture in a record of the electronic data store associated with the first activity profile.

The system may further include an electronic data store in communication with the one or more hardware computing devices and configured to store a plurality of activity profiles including the first activity profile, each of the plurality of activity profiles being associated with a corresponding activity source that is different from the corresponding activity sources of each other activity profile. Each threat factor of the plurality of threat factors may be associated with a completeness value and a weight scalar, and to produce the threat score, the instructions, when executed by the processor, further cause the system to: identify, from one or more of the plurality of activity profiles, as one or more threats against the first user account, the corresponding activity sources that attempted to communicate with the first virtual computing environment, and were disallowed communication with at most the maximum number of the sets of user resources not associated with the first user account, the one or more threats against the first user account including the first activity source; obtain malicious activity data from each of the plurality of activity profiles associated with one of the threats; calculate a completeness of each of the threat factors based on the corresponding completeness values and the malicious activity data; and, calculate the threat level score based on the completeness and the weight scalar of each of the threat factors.

The instructions, when executed by the process, may further cause the system to, periodically in accordance with a logging period having a duration: receive previous period log information describing network activity occurring, in the duration of the logging period, between any of the plurality of activity sources and any of the plurality of virtual computing environments; transform the previous period log information to produce a corresponding data capture that describes the network activity associated, in the previous period log information, with the first activity source; add the corresponding data capture to a plurality of consecutive data captures in the first activity profile; determine that a count of the plurality of consecutive data captures, including the corresponding data capture, exceeds a number of logging periods designated by a rolling time window; remove, from the plurality of consecutive data captures, an oldest data capture produced before any other of the plurality of consecutive data captures; and update, based on adding the corresponding data capture and removing the oldest data capture, one or more aggregated parameters of the first activity profile.

In another embodiment, the one or more hardware computing devices include physical computing resources including the processor and memory, and the specific computer-executable instructions, when executed by the processor, cause the system to implement, within an allocation of the physical computing resources, a threat intelligence system that: receives log information describing network activity of a plurality of computing resources executing in a computing environment of a computing resource service provider; identifies a first activity source in the log information; stores, in a first activity profile associated with the first activity source, data associated with the log information describing the network activity to or from the first activity source; receives an instruction to calculate a threat level score for a first user account of a plurality of user accounts of the computing resource service provider; determines that the data of the first activity profile describes first network activity between the first activity source and a first user resource of the plurality of computing resources, the first user resource being associated with the first user account; determines, based on denied network activity described in the first activity profile and on one or more parameters for differentiating between mass scan activity and directed attack activity, that the first activity source is a threat against the first user account; based on at least the first activity profile, evaluates a plurality of threat factors to produce the threat level score, the plurality of threat factors selected to differentiate between directed attack activity and abnormal benign activity; and, performs a first action associated with the threat level score.

The threat intelligence system implemented by the system, in some embodiments, further receives the log information as a plurality of sequential batches, received sequentially and periodically according to a logging period. Upon receipt of each of the plurality of batches, the threat intelligence system: transforms the batch to produce a corresponding data capture that describes the network activity of the first activity source during a time frame of the batch; adds the corresponding data capture to a plurality of sequential data captures in the first activity profile; determines, for each one or more aggregated parameters associated with the network activity, a corresponding value from the corresponding data capture; and, incorporates the corresponding values into previous values of the one or more aggregated parameters to re-aggregate the one or more aggregated parameters. The threat intelligence system, in some embodiments, further: determines that a count of the plurality of sequential data captures, including the corresponding data capture, exceeds a number of logging periods designated by a rolling time window; removes, from the plurality of sequential data captures, an oldest data capture produced before any other of the plurality of consecutive data captures; and, re-aggregates the one or more aggregated parameters to exclude contributing values associated with the oldest data capture.

The threat intelligence system, in some embodiments, further: receives threat information from a threat assessment service of the computing resource service provider; determines that the threat information is associated with the first activity source; and, stores the threat information in the first activity profile. The threat intelligence system, in some embodiments, further: receives threat information from a threat assessment service of the computing resource service provider; determines that the threat information is associated with the first activity source; determines that the threat information comprises the instruction to calculate the threat level score for the first user account; and, uses the threat information to further determine that the first activity source is a threat against the first user account. The system may further include an electronic data store in communication with the one or more hardware computing devices and storing a plurality of activity profiles including the first activity profile, wherein each of the plurality of activity profiles: is associated with a corresponding activity source, of a plurality of activity sources appearing in the log information, that is different from the corresponding activity sources of each other activity profile; and stores one or more references to corresponding data from the log information describing the network activity to or from the corresponding activity source. The threat intelligence system, in some embodiments, further: obtains a group identifier associated with a group of related activity sources, the group comprising one of an organization, a geolocation, and an internet service provider; using the group identifier, identifies, as one of one or more related profiles, each of the plurality of activity profiles that is associated with a corresponding activity source that belongs to the group, the system maintaining a count of the one or more related profiles; determines that the count exceeds a threshold value for grouping related profiles; and, merges the one or more related profiles to produce, as one of the plurality of activity profiles, a group activity profile that includes the group identifier and the corresponding activity sources of the merged related profiles.

The electronic data store may further store a list of eligible user accounts of the plurality of user accounts, and the threat intelligence system, in some embodiments, further: receives user input activating a threat level scoring service for the first user account; stores the first user account in the list of eligible user accounts; receives, as the instruction, an indication that a scan period has elapsed since a previous threat level scan of the plurality of computing resources that are associated with one of the eligible user accounts; and, determines that the first user account is one of the eligible user accounts. The plurality of threat factors may each be based on malicious network activity by a total count of threats against the first user account, and the threat intelligence system may identify each threat from a different one of the plurality of activity profiles. The plurality of threat factors for the threat level score of the first user account may include: the total count of threats against the first user account; a count of targeted resources associated with the first user account that were subjected to malicious activity of the threats; a count of communication ports identified in the malicious activity; and a count of transfer protocols used in the malicious activity.

To determine that the first activity source is a threat against the first user account, the threat intelligence system may determine, based on the corresponding data in the first activity profile, that at most a maximum number of the plurality of computing resources that are associated with a corresponding user account, other than the first user account, denied at least some of the network activity with the first activity source. The threat intelligence system, in some embodiments, receives input data associated with the first user account and identifying one or more user-provided settings, and obtains the maximum number from the user-provided settings.

In another embodiment, the present disclosure provides a system for measuring a threat level of network activity to a set of computing resources provided by a computing resource service provider in a first virtual computing environment associated with a first user of the computing resource service provider. The system includes one or more hardware computing devices including physical computing resources including a processor and memory storing specific computer-executable instructions that, when executed by the processor, cause the system to implement, within an allocation of the physical computing resources: an activity profiling system that receives log information describing network activity of a plurality of computing resources, including the set of computing resources, executing in a computing environment of the computing resource service provider, and parses the log information, based on a plurality of activity sources of the network activity, to produce a plurality of activity profiles each associated with a corresponding activity source of the plurality of activity sources; and, a threat evaluation system that receives an instruction to calculate a threat level score associated with the first user, identifies each of the plurality of activity profiles describing network activity between the corresponding activity source and the set of computing resources that is potential directed attack activity, and compares the potential directed attack activity to a plurality of threat factors to produce the threat level score, the plurality of threat factors selected to differentiate between directed attack activity and abnormal benign activity.

To receive the log information, in some embodiments the activity profiling system periodically obtains network activity logs produced by each of a plurality of virtual computing environments, including the first virtual computing environment, each associated with a corresponding user account of a plurality of user accounts of the computing resource service provider. The activity profiling system may include a plurality of nodes distributed within a computing environment of the computing resource service provider, wherein each of the plurality of nodes obtains one or more of the network activity logs and parses the one or more of the network activity logs, based on the plurality of activity sources of the network activity, to produce one or more intermediate activity profiles each associated with a corresponding activity source of the plurality of activity sources. The activity profiling system may further include a merging system that receives the one or more intermediate activity profiles from each of the plurality of nodes and merges intermediate activity profiles associated with the same activity source to produce the plurality of activity profiles. The system may further include a central data store storing the plurality of activity profiles, and the activity profiling system may include a plurality of nodes distributed within a computing environment of the computing resource service provider, wherein each of the plurality of nodes accesses a message relay service that distributes the network activity logs via one or more queues, obtains one or more of the network activity logs from the message relay service, parses the one or more of the network activity logs, based on the plurality of activity sources of the network activity, to produce one or more intermediate activity profiles, and cooperates with each other node of the plurality of nodes to produce, from the one or more intermediate activity profiles, the plurality of activity profiles.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising one or more hardware computing devices including physical computing resources including a processor and memory storing specific computer-executable instructions that, when executed by the processor, cause the system to implement, within an allocation of the physical computing resources, a threat intelligence system that:
   receives log information describing network activity of a plurality of computing resources executing in a computing environment of a computing resource service provider;
   identifies a first activity source in the log information;

stores, in a first activity profile associated with the first activity source, data associated with the log information describing the network activity to or from the first activity source;

receives an instruction to calculate a threat level score for a first user account of a plurality of user accounts of the computing resource service provider;

determines that the data of the first activity profile describes first network activity between the first activity source and a first user resource of the plurality of computing resources, the first user resource being associated with the first user account;

determines, based on denied network activity described in the first activity profile and on one or more parameters for differentiating between mass scan activity and directed attack activity, that the first activity source is a threat against the first user account;

based on at least the first activity profile, evaluates a plurality of threat factors to produce the threat level score, the plurality of threat factors selected to differentiate between directed attack activity and abnormal benign activity; and performs a first action associated with the threat level score.

2. The system of claim 1, wherein the threat intelligence system implemented by the system further:

receives the log information as a plurality of sequential batches, received sequentially and periodically according to a logging period; and upon receipt of each of the plurality of batches:

transforms the batch to produce a corresponding data capture that describes the network activity of the first activity source during a time frame of the batch, adds the corresponding data capture to a plurality of sequential data captures in the first activity profile, determines, for each one or more aggregated parameters associated with the network activity, a corresponding value from the corresponding data capture, and incorporates the corresponding values into previous values of the one or more aggregated parameters to re-aggregate the one or more aggregated parameters.

3. The system of claim 2, wherein the threat intelligence system implemented by the system further:

determines that a count of the plurality of sequential data captures, including the corresponding data capture, exceeds a number of logging periods designated by a rolling time window;

removes, from the plurality of sequential data captures, an oldest data capture produced before any other of the plurality of consecutive data captures; and re-aggregates the one or more aggregated parameters to exclude contributing values associated with the oldest data capture.

4. The system of claim 1, wherein the threat intelligence system implemented by the system further:

receives threat information from a threat assessment service of the computing resource service provider;

determines that the threat information is associated with the first activity source; and stores the threat information in the first activity profile.

5. The system of claim 1, wherein the threat intelligence system implemented by the system further:

receives threat information from a threat assessment service of the computing resource service provider;

determines that the threat information is associated with the first activity source;

determines that the threat information comprises the instruction to calculate the threat level score for the first user account; and uses the threat information to further determine that the first activity source is a threat against the first user account.

6. The system of claim 1, further comprising an electronic data store in communication with the one or more hardware computing devices and storing a plurality of activity profiles including the first activity profile, each of the plurality of activity profiles:

being associated with a corresponding activity source, of a plurality of activity sources appearing in the log information, that is different from the corresponding activity sources of each other activity profile; and storing one or more references to corresponding data from the log information describing the network activity to or from the corresponding activity source.

7. The system of claim 6, wherein the threat intelligence system implemented by the system further:

obtains a group identifier associated with a group of related activity sources, the group comprising one of an organization, a geolocation, and an internet service provider;

using the group identifier, identifies, as one of one or more related profiles, each of the plurality of activity profiles that is associated with a corresponding activity source that belongs to the group, the system maintaining a count of the one or more related profiles;

determines that the count exceeds a threshold value for grouping related profiles; and merges the one or more related profiles to produce, as one of the plurality of activity profiles, a group activity profile that includes the group identifier and the corresponding activity sources of the merged related profiles.

8. The system of claim 6, wherein the electronic data store further stores a list of eligible user accounts of the plurality of user accounts, and the threat intelligence system implemented by the system further:

receives user input activating a threat level scoring service for the first user account;

stores the first user account in the list of eligible user accounts;

receives, as the instruction, an indication that a scan period has elapsed since a previous threat level scan of the plurality of computing resources that are associated with one of the eligible user accounts; and determines that the first user account is one of the eligible user accounts.

9. The system of claim 6, wherein the plurality of threat factors are each based on malicious network activity by a total count of threats against the first user account, and the threat intelligence system implemented by the system identifies each threat from a different one of the plurality of activity profiles.

10. The system of claim 9, wherein the plurality of threat factors for the threat level score of the first user account are:

the total count of threats against the first user account;

a count of targeted resources associated with the first user account that were subjected to malicious activity of the threats;

a count of communication ports identified in the malicious activity; and a count of transfer protocols used in the malicious activity.

11. The system of claim 6, wherein to determine that the first activity source is a threat against the first user account, the threat intelligence system implemented by the system determines, based on the corresponding data in the first activity profile, that at most a maximum number of the plurality of computing resources that are associated with a corresponding user account, other than the first user account, denied at least some of the network activity with the first activity source.

12. The system of claim 11, wherein the threat intelligence system implemented by the system:
receives input data associated with the first user account and identifying one or more user-provided settings; and
obtains the maximum number from the user-provided settings.

13. A method, comprising:
implementing, within an allocation of physical computing resources including a processor and memory storing specific computer-executable instructions, a threat intelligence system;
receiving, by the threat intelligence system, log information describing network activity of a plurality of computing resources executing in a computing environment of a computing resource service provider;
identifying, by the threat intelligence system, a first activity source in the log information;
storing, by the threat intelligence system in a first activity profile associated with the first activity source, data associated with the log information describing the network activity to or from the first activity source;
receiving, by the threat intelligence system, an instruction to calculate a threat level score for a first user account of a plurality of user accounts of the computing resource service provider;
determining, by the threat intelligence system, that the data of the first activity profile describes first network activity between the first activity source and a first user resource of the plurality of computing resources, the first user resource being associated with the first user account;
determining, by the threat intelligence system based on denied network activity described in the first activity profile and on one or more parameters for differentiating between mass scan activity and directed attack activity, that the first activity source is a threat against the first user account;
based on at least the first activity profile, evaluating, by the threat intelligence system, a plurality of threat factors to produce the threat level score, the plurality of threat factors selected to differentiate between directed attack activity and abnormal benign activity; and
performing, by the threat intelligence system, a first action associated with the threat level score.

14. The method of claim 13, further comprising the steps of:
receiving, by the threat intelligence system, the log information as a plurality of sequential batches, received sequentially and periodically according to a logging period; and
upon receipt of each of the plurality of batches:
transforming, by the threat intelligence system, the batch to produce a corresponding data capture that describes the network activity of the first activity source during a time frame of the batch,
adding, by the threat intelligence system, the corresponding data capture to a plurality of sequential data captures in the first activity profile,
determining, by the threat intelligence system, for each one or more aggregated parameters associated with the network activity, a corresponding value from the corresponding data capture, and
incorporating, by the threat intelligence system, the corresponding values into previous values of the one or more aggregated parameters to re-aggregate the one or more aggregated parameters.

15. The method of claim 14, further comprising the steps of
determining, by the threat intelligence system, that a count of the plurality of sequential data captures, including the corresponding data capture, exceeds a number of logging periods designated by a rolling time window;
removing, by the threat intelligence system, from the plurality of sequential data captures, an oldest data capture produced before any other of the plurality of consecutive data captures; and
re-aggregating, by the threat intelligence system, the one or more aggregated parameters to exclude contributing values associated with the oldest data capture.

16. The method of claim 13, further comprising the steps of:
receiving, by the threat intelligence system, threat information from a threat assessment service of the computing resource service provider;
determining, by the threat intelligence system, that the threat information is associated with the first activity source; and
storing, by the threat intelligence system, the threat information in the first activity profile.

17. The method of claim 13, further comprising the steps of:
receiving, by the threat intelligence system, threat information from a threat assessment service of the computing resource service provider;
determining, by the threat intelligence system, that the threat information is associated with the first activity source;
determining, by the threat intelligence system, that the threat information comprises the instruction to calculate the threat level score for the first user account; and
using, by the threat intelligence system, the threat information to further determine that the first activity source is a threat against the first user account.

18. The method of claim 13, wherein a plurality of activity sources appear in the log information, each activity source of the plurality of activity sources being associated with one of a plurality of activity profiles, where each activity profile of the plurality of activity profiles is associated with an activity source that is different from the corresponding activity sources of each other activity profile of the plurality of activity profiles, the plurality of activity profiles including the first activity profile, and further comprising the steps of:
storing, by the threat intelligence system, one or more references to corresponding data from the log information describing the network activity to or from the corresponding activity source.

19. The method of claim 18, further comprising the steps of:
obtaining, by the threat intelligence system, a group identifier associated with a group of related activity sources, the group comprising one of an organization, a geolocation, and an internet service provider;
using the group identifier, identifying, by the threat intelligence system and as one of one or more related profiles, each of the plurality of activity profiles that is associated with a corresponding activity source that belongs to the group, the system maintaining a count of the one or more related profiles;

determining, by the threat intelligence system, that the count exceeds a threshold value for grouping related profiles; and merging, by the threat intelligence system, the one or more related profiles to produce, as one of the plurality of activity profiles, a group activity profile that includes the group identifier and the corresponding activity sources of the merged related profiles.

20. The method of claim 18, further comprising the steps of:

receiving, by the threat intelligence system, user input activating a threat level scoring service for the first user account;

storing, by the threat intelligence system, the first user account in a list of eligible user accounts of the plurality of user accounts;

receiving, by the threat intelligence system and as the instruction, an indication that a scan period has elapsed since a previous threat level scan of the plurality of computing resources that are associated with one of the eligible user accounts; and determining, by the threat intelligence system, that the first user account is one of the eligible user accounts.

* * * * *